United States Patent
Holmes

(10) Patent No.: US 10,723,164 B2
(45) Date of Patent: Jul. 28, 2020

(54) SECURITY DEVICES AND METHODS OF MANUFACTURE THEREOF

(71) Applicant: DE LA RUE INTERNATIONAL LIMITED, Basingstoke, Hampshire (GB)

(72) Inventor: Brian William Holmes, Fleet (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 0 days.

(21) Appl. No.: 16/346,224

(22) PCT Filed: Oct. 31, 2017

(86) PCT No.: PCT/GB2017/053265
§ 371 (c)(1),
(2) Date: Apr. 30, 2019

(87) PCT Pub. No.: WO2018/083454
PCT Pub. Date: May 11, 2018

(65) Prior Publication Data
US 2019/0263169 A1    Aug. 29, 2019

(30) Foreign Application Priority Data

Nov. 1, 2016    (GB) .................................. 1618441.8

(51) Int. Cl.
*B42D 25/324*    (2014.01)
*B42D 25/36*    (2014.01)
(Continued)

(52) U.S. Cl.
CPC .............. *B42D 25/324* (2014.10); *B32B 1/00* (2013.01); *B32B 1/04* (2013.01); *B42D 25/29* (2014.10);
(Continued)

(58) Field of Classification Search
CPC ...... B42D 25/324; B42D 25/36; B42D 25/29; B42D 25/328; B42D 25/355;
(Continued)

(56) References Cited

U.S. PATENT DOCUMENTS

2003/0058491 A1* 3/2003 Holmes ................ G03H 1/0252
359/2
2005/0174644 A1    8/2005 Heim
(Continued)

FOREIGN PATENT DOCUMENTS

DE    10 2007 034716 A1    1/2009
WO    02/00445 A1    1/2002
(Continued)

OTHER PUBLICATIONS

Apr. 27, 2017 Office Action issued in British Patent Application No. 1618441.8.
(Continued)

*Primary Examiner* — Justin V Lewis
(74) *Attorney, Agent, or Firm* — Oliff PLC

(57) ABSTRACT

A method of manufacturing a security device is provided. The method comprises providing a substrate, the substrate having opposing first and second surfaces and a relief structure formed in the first surface of the substrate. A reflection enhancing layer is applied over the first surface of the substrate such that the reflection enhancing layer at least partially overlaps the relief structure and such that a first region of the first surface of the substrate does not have the reflection enhancing layer. An absorber layer is applied over the reflection enhancing layer such that the absorber layer at least partially overlaps the reflection enhancing layer and the relief structure where the reflection enhancing layer and the relief structure overlap each other, and such that the absorber
(Continued)

layer at least partially overlaps the first region of the first surface of the substrate. An optical spacer layer is applied over the absorber layer such that the optical spacer layer at least partially overlaps the absorber layer, reflection enhancing layer and the relief structure where the absorber layer, reflection enhancing layer and the relief structure overlap each other, and such that the optical spacer layer at least partially overlaps the absorber layer and the first region where the absorber layer and the first region overlap each other. A reflector layer, formed of an at least partially reflective material, is applied over the optical spacer layer such that the reflector layer at least partially overlaps the optical spacer layer, the absorber layer, the reflection enhancing layer and the relief structure where the optical spacer layer, the absorber layer, the reflection enhancing layer and the relief structure overlap each other, and such that the reflector layer at least partially overlaps the optical spacer layer, the absorber layer and the first region where the optical spacer layer, the absorber layer and the first region overlap each other. The reflection enhancing layer and the absorber layer are formed of the same material. The absorber layer, the optical spacer layer and the reflector layer, together, form a colour-shifting structure. The reflection enhancing layer and the absorber layer, together, are substantially opaque or transmit less than 40% of incident light, preferably less than 20% of incident light.

19 Claims, 21 Drawing Sheets

(51) Int. Cl.
  *B32B 1/00* (2006.01)
  *B42D 25/29* (2014.01)
  *B42D 25/328* (2014.01)
  *B42D 25/355* (2014.01)
  *B42D 25/373* (2014.01)
  *B32B 1/04* (2006.01)
(52) U.S. Cl.
  CPC ......... *B42D 25/328* (2014.10); *B42D 25/355* (2014.10); *B42D 25/36* (2014.10); *B42D 25/373* (2014.10); *B32B 2425/00* (2013.01); *B32B 2554/00* (2013.01)
(58) Field of Classification Search
  CPC ........ B42D 25/373; B42D 25/45; B32B 1/00; B32B 1/04; B32B 2425/00; B32B 2554/00
  USPC .................... 283/67, 70, 72, 74, 94, 98, 901
  See application file for complete search history.

(56) References Cited

U.S. PATENT DOCUMENTS

| 2007/0211317 A1 | 9/2007 | Heim |
| 2008/0018965 A1 | 1/2008 | Phillips et al. |
| 2011/0007374 A1 | 1/2011 | Heim |

FOREIGN PATENT DOCUMENTS

| WO | 2014/118569 A1 | 8/2014 |
| WO | 2015/107347 A1 | 7/2015 |
| WO | 2016/034274 A1 | 3/2016 |

OTHER PUBLICATIONS

Feb. 23, 2018 International Search Report issued in International Patent Application No. PCT/GB2017/053265.

Feb. 23, 2018 Written Opinion of the International Searching Authority issued in International Patent Application No. PCT/GB2017/053265.

\* cited by examiner

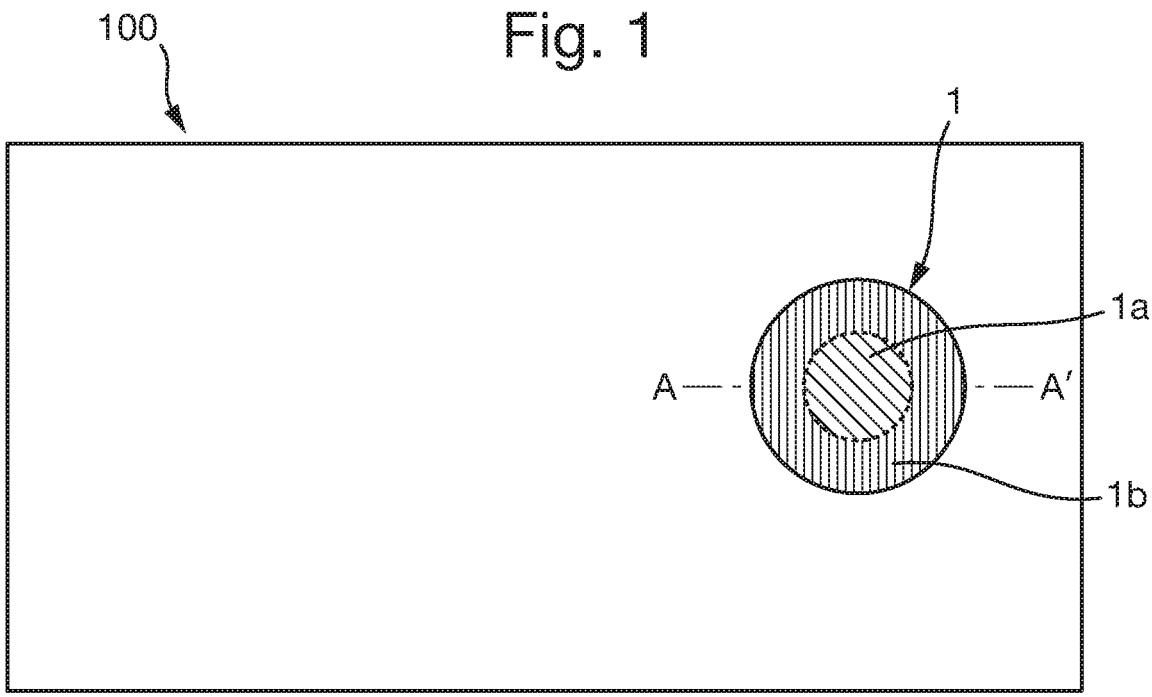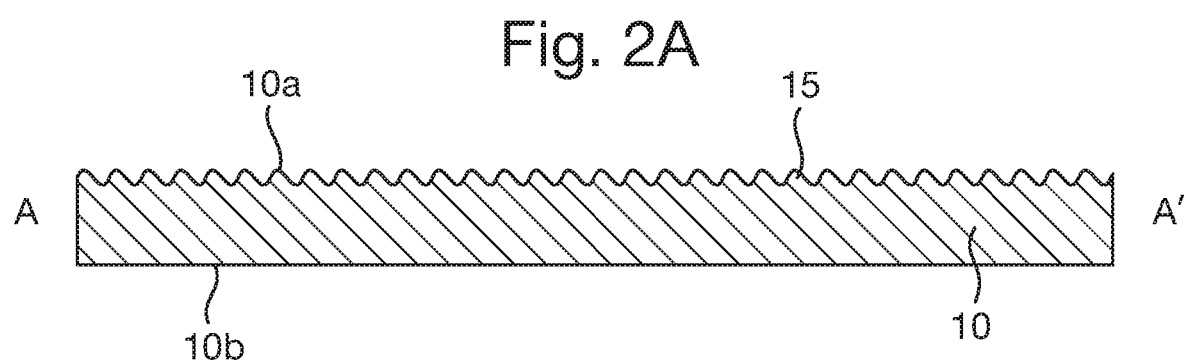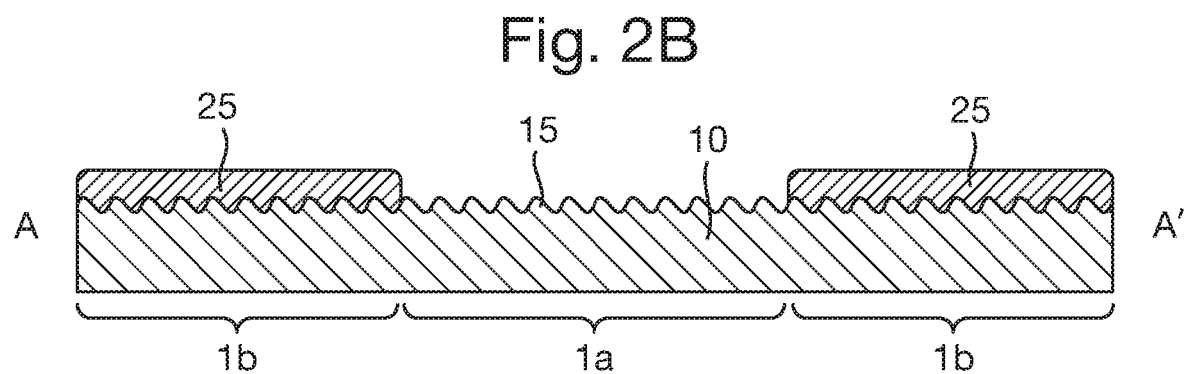

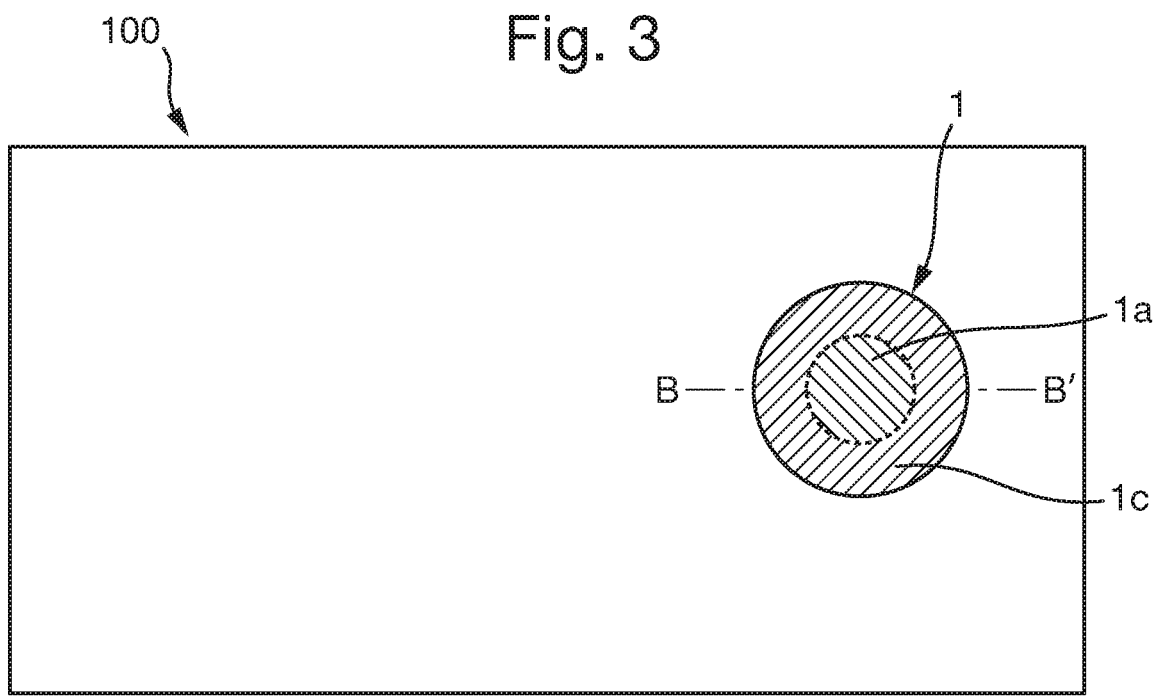
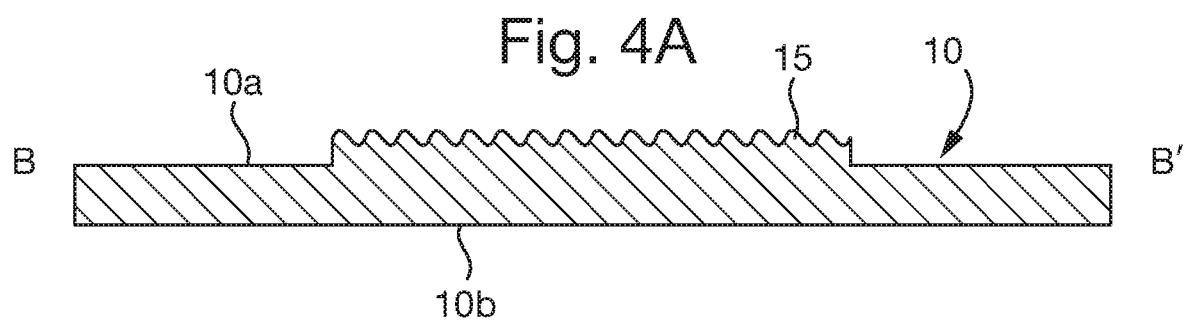
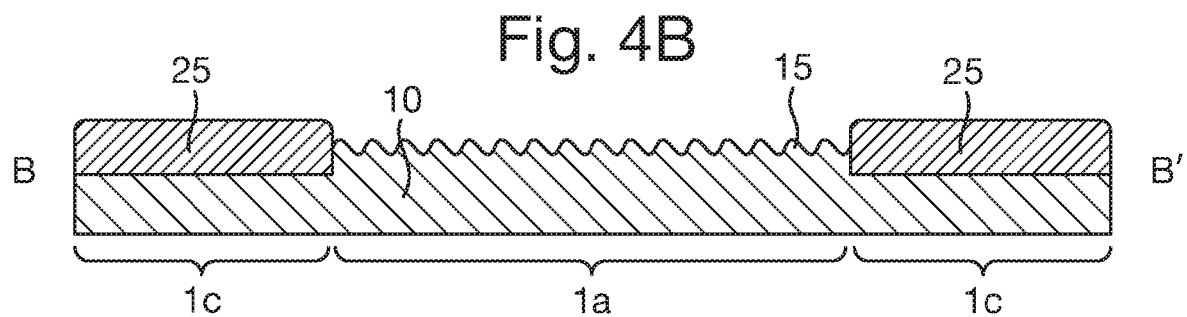

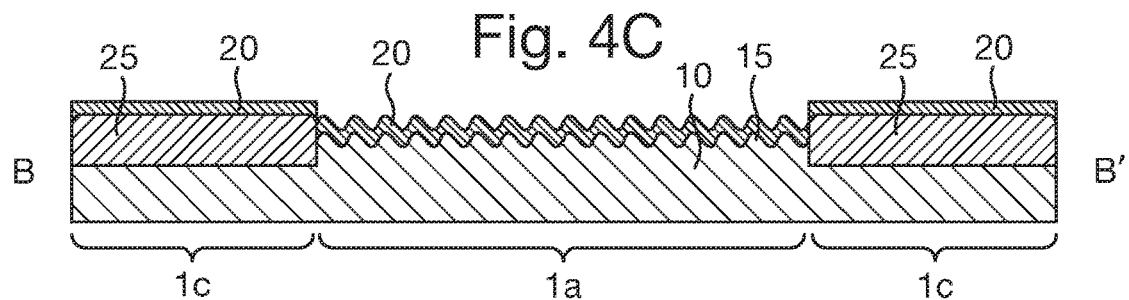
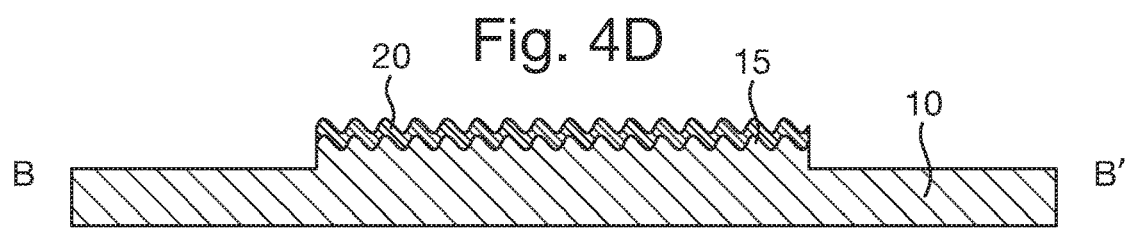
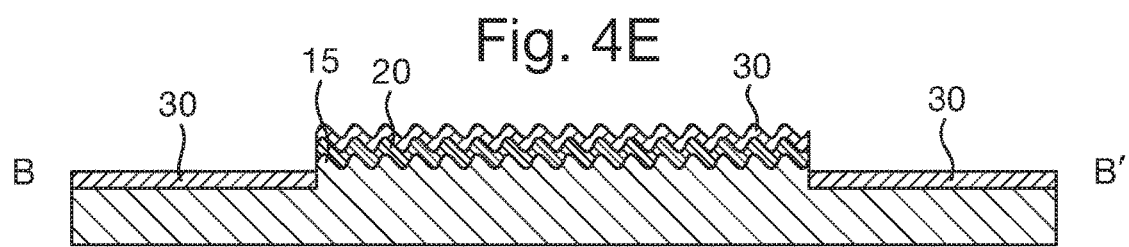
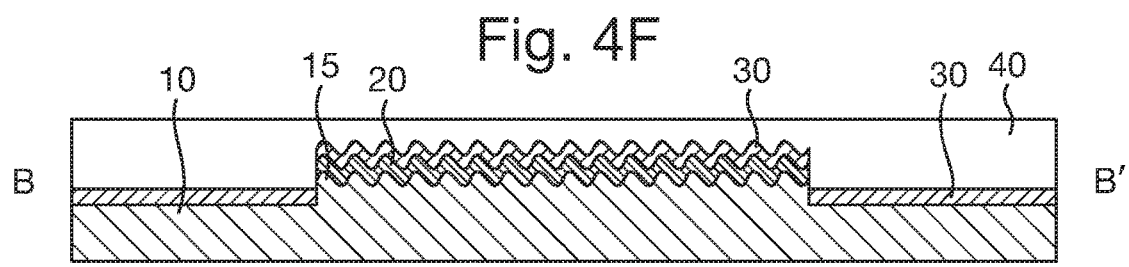
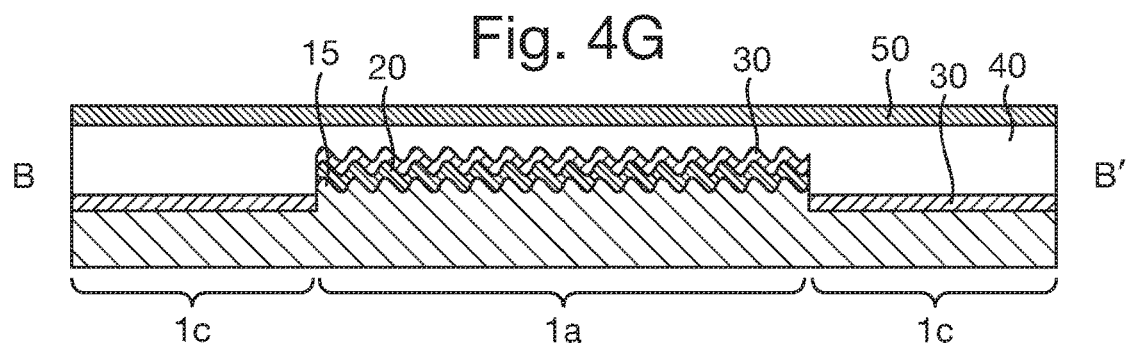

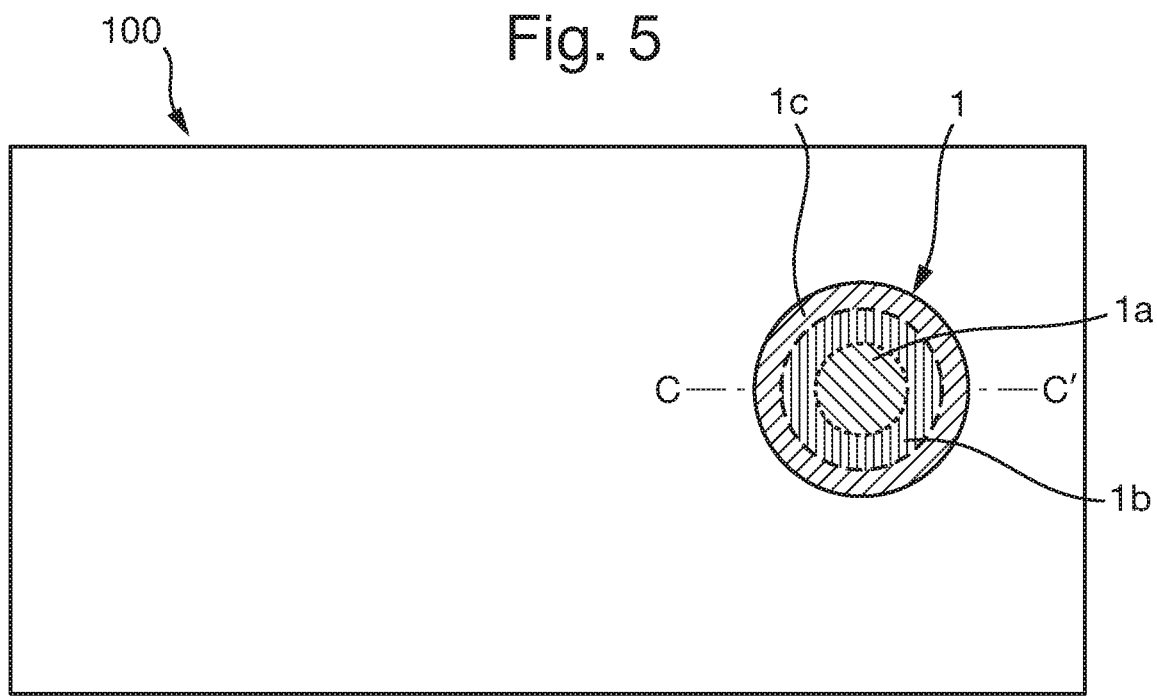
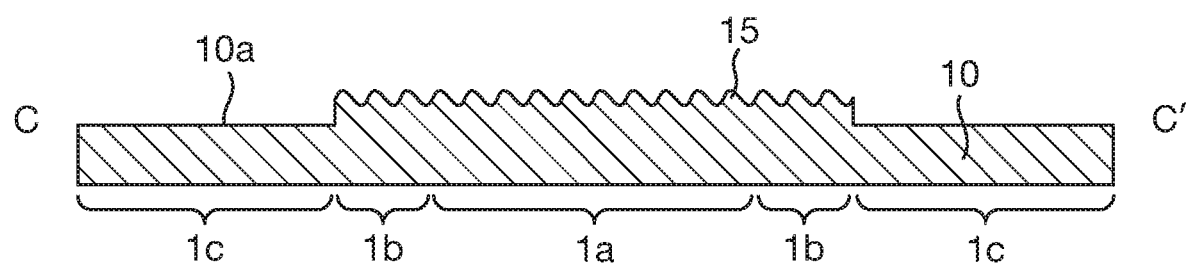
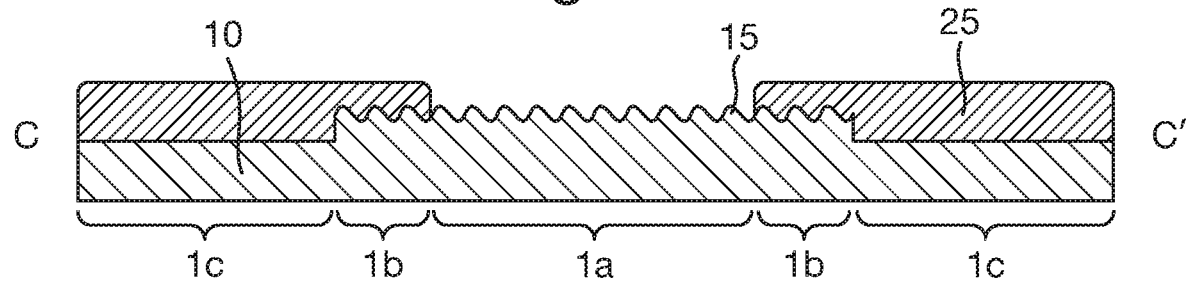

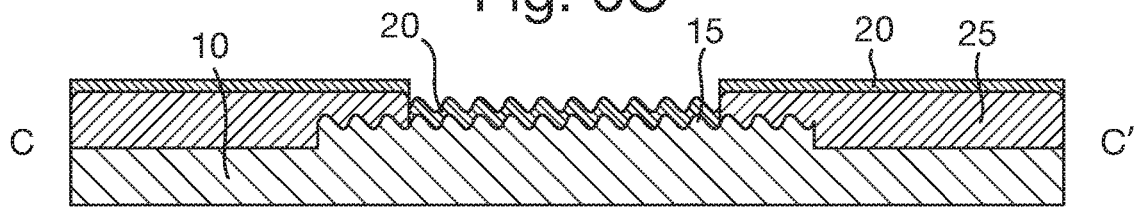
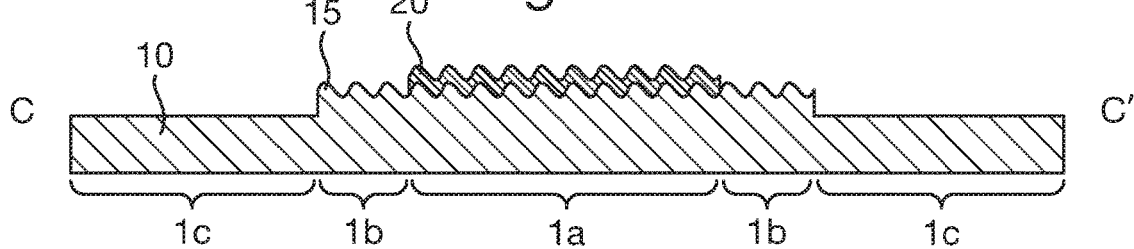
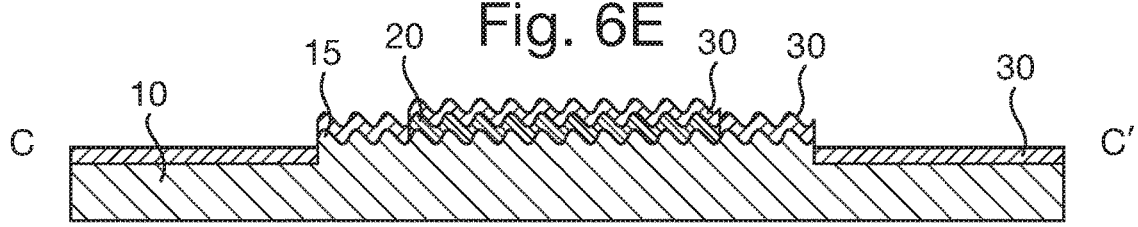
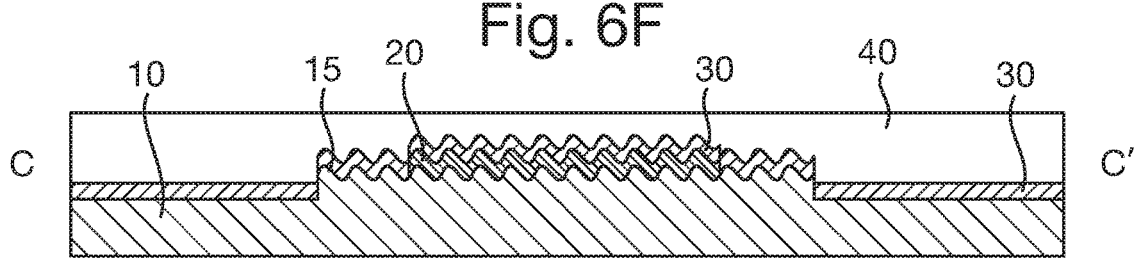
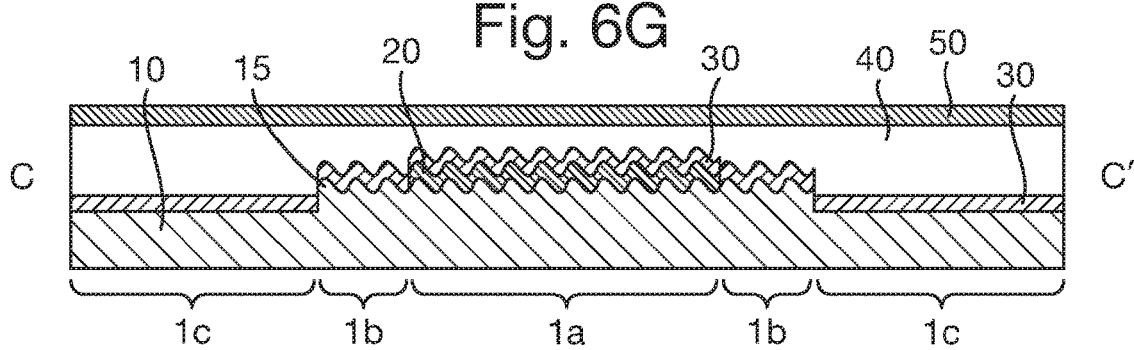

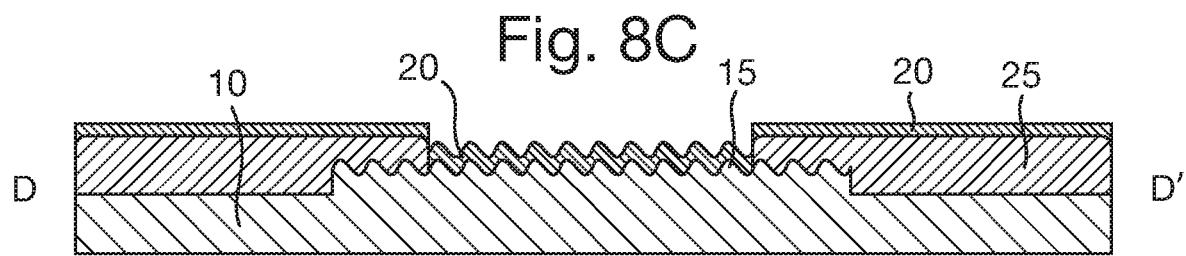
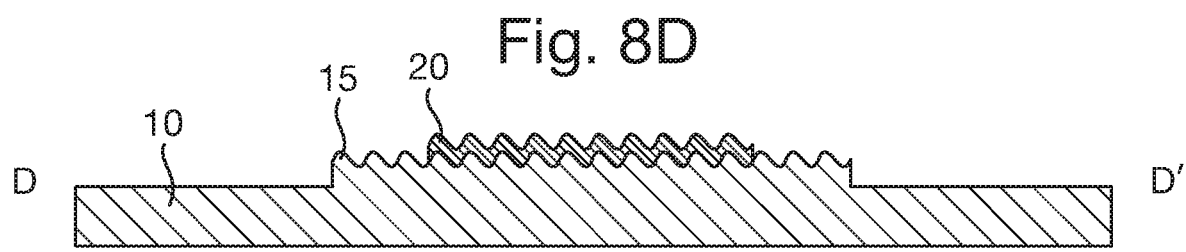
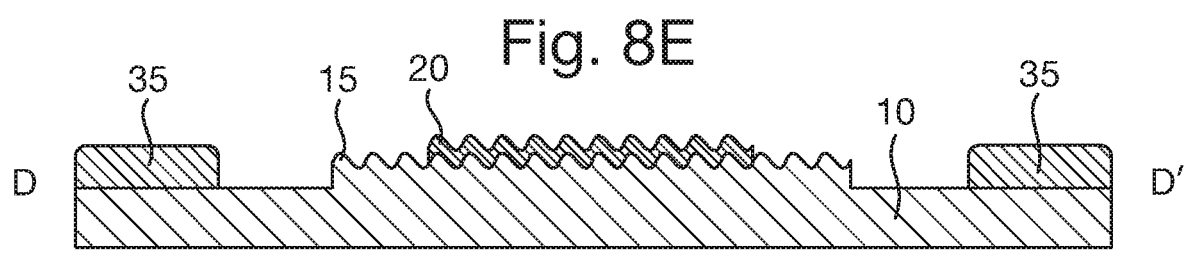
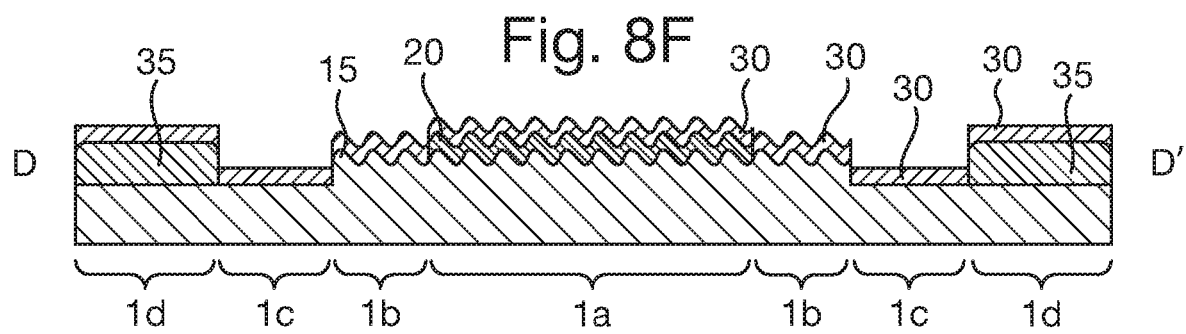

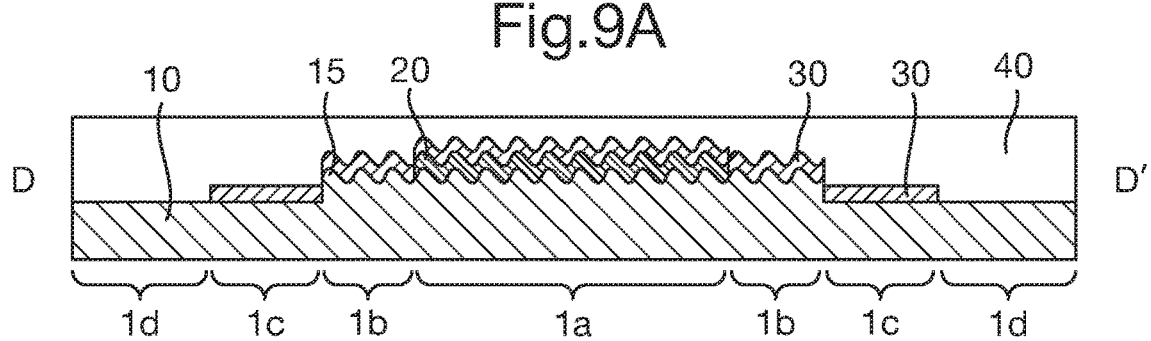
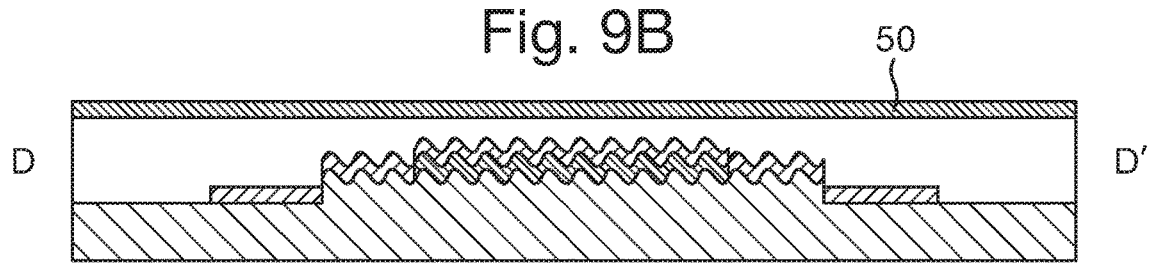
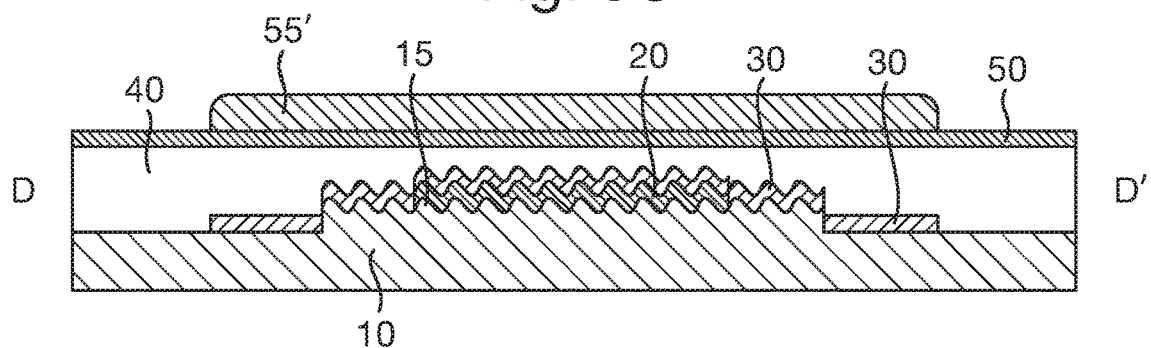
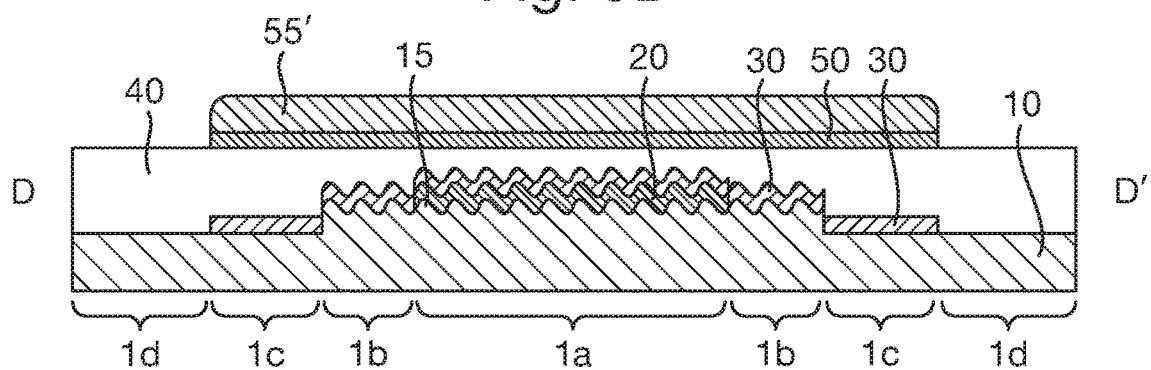

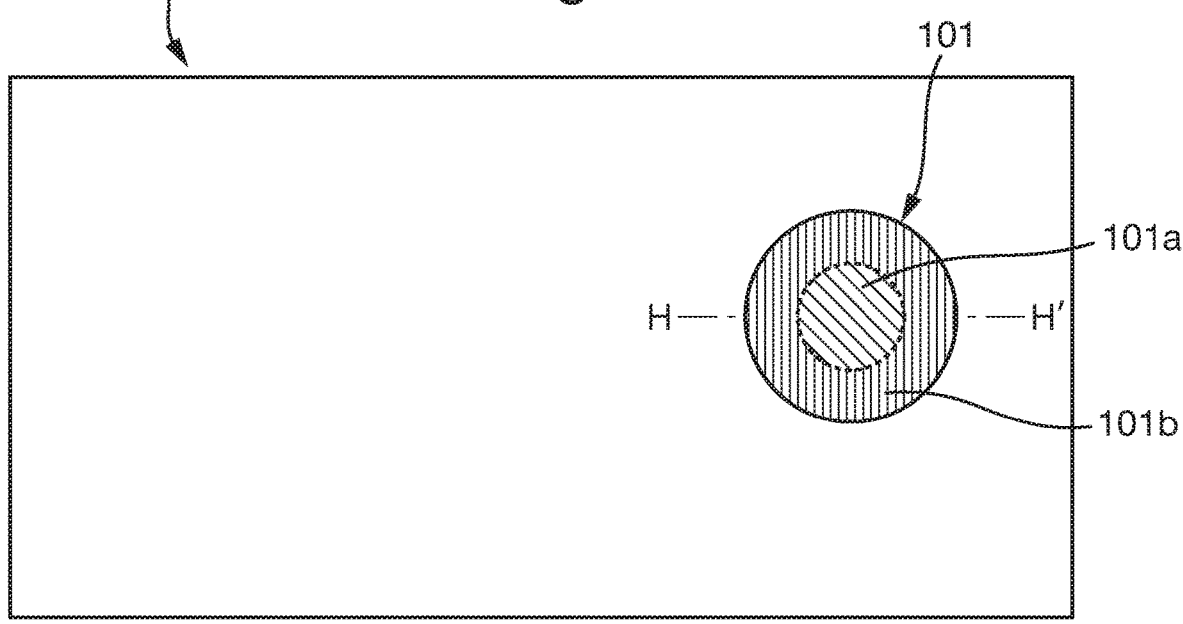
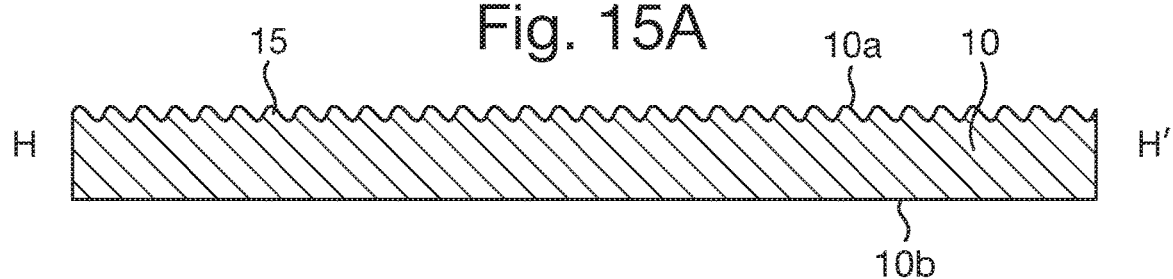
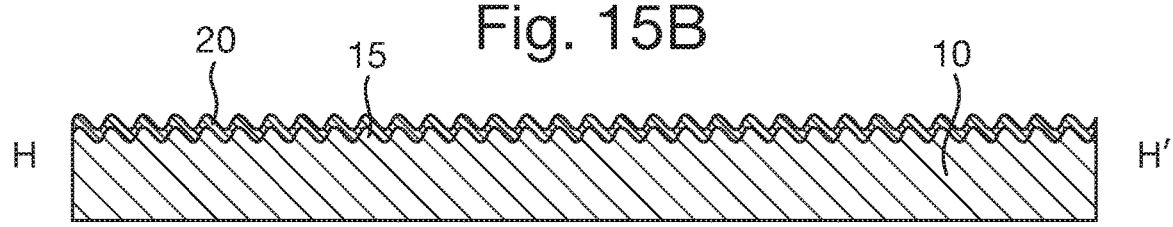

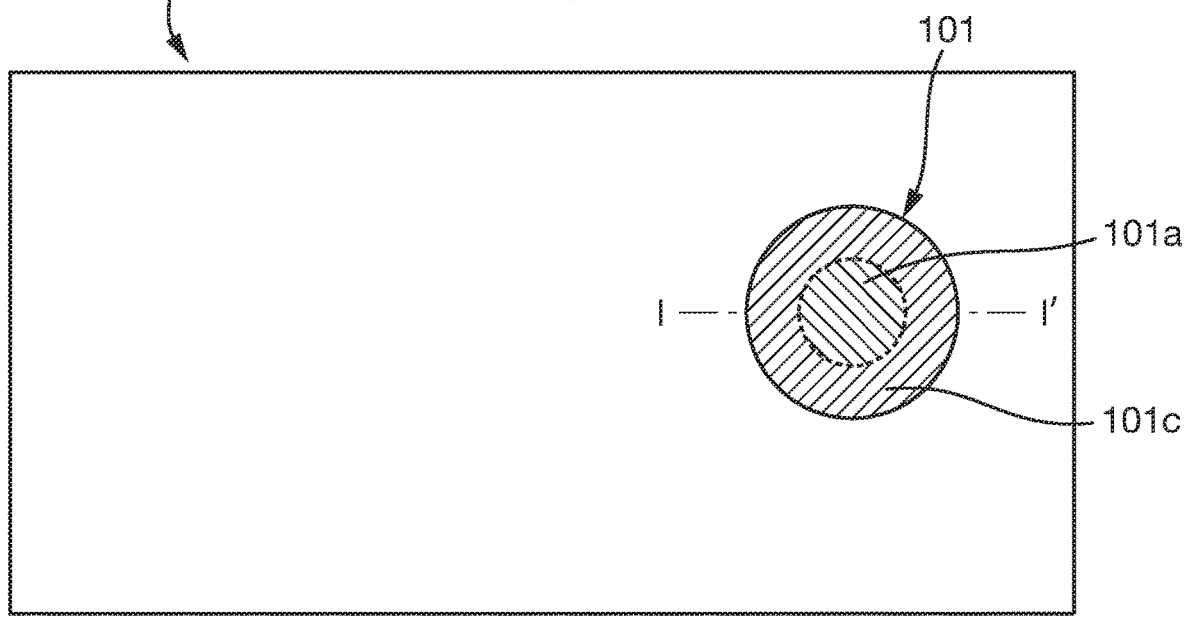

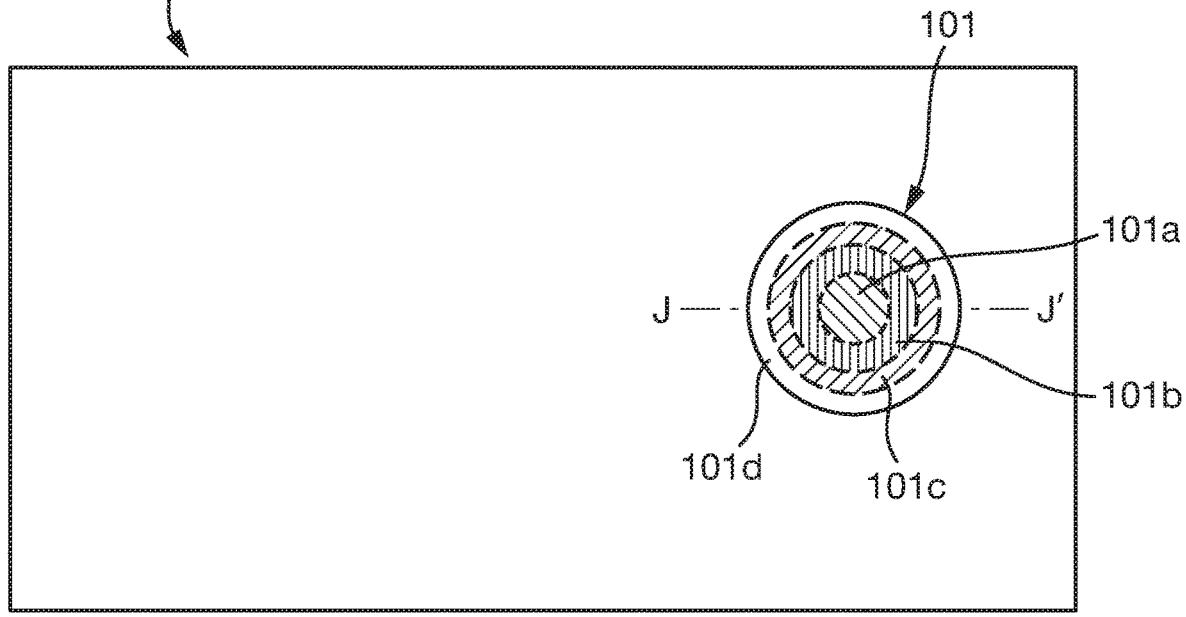
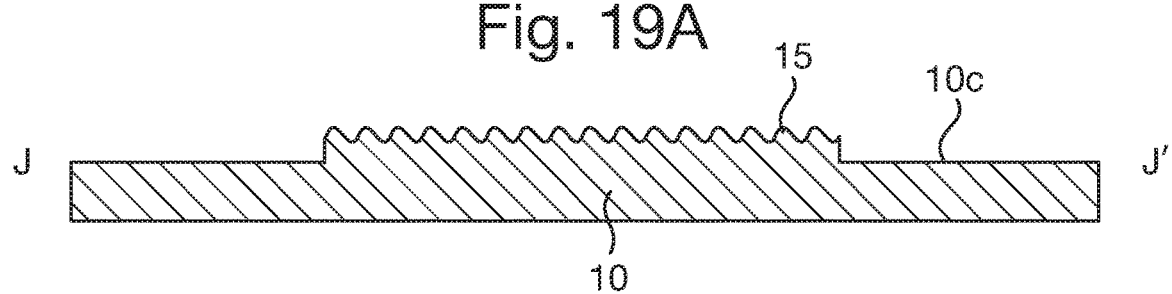
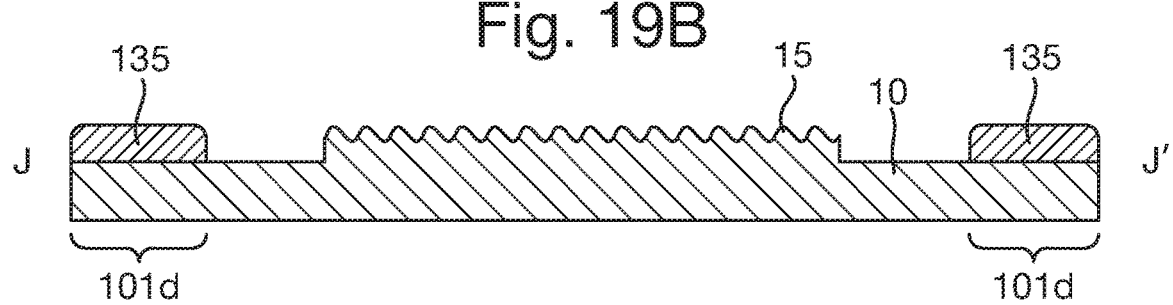

SECURITY DEVICES AND METHODS OF MANUFACTURE THEREOF

FIELD OF THE INVENTION

The present invention relates to security devices suitable for use in security documents such as banknotes, identity documents, passports, certificates and the like, as well as methods for manufacturing such security devices.

DESCRIPTION OF THE RELATED ART

To prevent counterfeiting and enable authenticity to be checked, security documents are typically provided with one or more security devices which are difficult or impossible to replicate accurately with commonly available means, particularly photocopiers, scanners or commercial printers. For increased security, visually complex devices may be used, which are difficult to replicate convincingly using more sophisticated techniques.

One way in which the visual complexity of a device may be increased is by providing the device with two or more different optically variable effects that are visible simultaneously.

A first type of optical effect commonly used in security devices is a colour-shifting effect, also known as thin-film interference. A colour-shifting structure, which produces such an effect, typically comprises at least a reflector layer and an absorber layer separated by an optical spacer layer. Interference between light reflecting from the reflector layer and the absorber layer causes the structure to have a coloured appearance, when viewed in reflection, which changes upon tilting as the optical path length between these layers changes depending on the viewing angle.

A second type of optical effect commonly used in security devices is one which utilises a reflective relief structure. These types of devices include diffractive devices operating typically in the zeroth, first or higher orders of diffraction and with grating periodicities generally less than 10 um and more typically less than 5 um and also periodic grids or arrays of triangulated or faceted structures, sometimes referred as micro-mirrors with periodicities typically greater than 5 um and more typically 10 um such that the incident light is geometrically reflected off one of the faceted sides in accordance with the laws of geometrical reflection. These devices typically comprise a substrate embossed or otherwise provided with a relief structure configured to produce the desired optical effect and optionally coated with a reflection enhancing material to improve the replay brightness.

It is known to combine these two types of optical effect in a single security device, and in particular, it is known to combine these two optical effects by providing one structure on top of the other. In some examples of such combinations, it is desirable to decouple the two effects, by which it is meant that observed light reflected from the device is only conditioned by either of these effects acting separately. In many devices comprising mutually decoupled effects, the result is that one optical effect is not visible through the other. Descriptions of method of providing both coupled and decoupled systems are provided in WO 02/00445 A1.

When providing decoupled systems, it is desirable to provide the device with an integrated appearance, by which it is meant that the two different optical effects appear to originate from one and the same structure. The integrated appearance of the device can pose significant problems to counterfeiters, who are unable to determine how the complex visual effect produced by the device originates from a single structure. In known security devices having decoupled colour-shifting and reflective relief effects, this has typically been difficult to achieve.

SUMMARY OF THE INVENTION

In accordance with a first aspect of the present invention, there is provided a method of manufacturing a security device comprising: providing a substrate, the substrate having opposing first and second surfaces and a relief structure formed in the first surface of the substrate; applying a reflection enhancing layer over the first surface of the substrate such that the reflection enhancing layer at least partially overlaps the relief structure and such that a first region of the first surface of the substrate does not have the reflection enhancing layer; applying an absorber layer over the reflection enhancing layer such that the absorber layer at least partially overlaps the reflection enhancing layer and the relief structure where they overlap each other, and such that the absorber layer at least partially overlaps the first region of the first surface of the substrate; applying an optical spacer layer over the absorber layer such that the optical spacer layer at least partially overlaps the absorber layer, reflection enhancing layer and the relief structure where they overlap each other, and such that the optical spacer layer at least partially overlaps the absorber layer and the first region where they overlap each other; and applying a reflector layer, formed of an at least partially reflective material, over the optical spacer layer such that the reflector layer at least partially overlaps the optical spacer layer, the absorber layer, the reflection enhancing layer and the relief structure where they overlap each other, and such that the reflector layer at least partially overlaps the optical spacer layer, the absorber layer and the first region where they overlap each other; wherein the reflection enhancing layer and the absorber layer are formed of the same material, wherein the absorber layer, the optical spacer layer and the reflector layer, together, form a colour-shifting structure, and wherein the reflection enhancing layer and the absorber layer, together, are substantially opaque or transmit less than 40% of incident light, preferably less than 20% of incident light.

It has been found that providing a security device in which the reflection enhancing layer of the reflective relief structure is formed of the same material as the absorber layer of the colour-shifting structure produces a security device that exhibits two identifiably different optical effects that have a more integrated appearance than similar devices known in the art. The result is a device that can prove difficult to reverse engineer and counterfeit by more sophisticated counterfeiting techniques.

The method according to this aspect of the invention comprises applying a reflection enhancing layer over the first surface of the substrate, preferably in contact with the substrate, such that it partially overlaps or coats the relief structure in reflection enhancing material. The reflection enhancing layer may be provided as a conformal or non-conformal coating to the relief structure. It will be appreciated that both a conformal and nonconformal coating will typically substantially conform to the relief structure in the surface facing the relief structure in order to improve the optical effect of the relief structure. Conformal and nonconformal coatings may differ in whether or not the surface facing away from the relief structure also conforms to the relief structure.

The reflection enhancing layer, applied to at least some of the relief structure, completes the reflective relief structure, such that a reflective relief effect, such as a diffractive or holographic effect will be exhibited by the finished security device.

The colour-shifting structure is then formed on the reflective relief structure, with an absorber layer, optical spacer layer and reflector layer applied on the relief structure and reflection enhancing layer. In forming the colour-shifting structure, preferably the optical spacer layer is in contact with the absorber layer, and/or preferably the reflector layer is in contact with the optical spacer layer. While these three layers are the minimum layers required to form a colour-shifting structure, additional layers could also be provided. For example, a second absorber layer and second optical spacer layer could be provided in order over the first optical spacer layer, i.e. between the first optical spacer layer and the reflector layer, to provide an additional boundary that will reflect light and cause interference effects.

The absorber layer is typically formed of a partially reflective material (typically Chrome or a Nickel Chrome alloy with a thickness of 5 nm), while the, reflector layer may be formed of a partially or entirely reflective material (typically Aluminium with a coat weight of 25-30 nm). Typically the optical spacer layer will be transparent, typically formed of a metal oxide such as magnesium fluoride. In many cases, the two-pass optical thickness of the optical spacer layer is tuned to give constructive interference between the partial amplitudes reflected at the absorber layer and the opaque metal layer. The optical spacer layer may also carry or incorporate a colour tint, for example to provide the security device with a more complex appearance, especially where it is comprised of an organic coating.

Throughout the present description, the terms absorber layer, reflector layer and reflection enhancing layer are used in relation to specific layers of the security device of the invention, each of which is provided at least partially for its reflective characteristics. That is, the reflection enhancing layer is the layer provided over or on the reflective relief structure to increase reflectivity and improve replay brightness of the relief structure, the absorber layer is the upper, partially reflective layer of the colour-shifting structure that provides a first boundary at which incident light is partially reflected, while the reflector layer refers to the lower reflective layer of the colour-shifting structure that provides a final boundary at which light is reflected for interference with light reflected by the absorber layer. In some embodiments, these layers may be very similar in their characteristics, e.g. they may be formed of the same material. However, their function in the security device is always as described above.

As mentioned above, this method provides a security device with a reflective relief effect that is, at least in a partial region, decoupled from the colour-shift effect. The reflective relief effect will be decoupled from a colour-shift effect behind it where there is provided, in the same region, the relief structure, reflection enhancing layer, absorber layer, optical spacer layer and reflector layer. This is because the reflection enhancing layer and absorber layer, together, are substantially opaque or strongly absorbing, preventing the colour-shifting structure from being visible through the reflective relief structure. Where the reflection enhancing layer and the absorber layer, together, transmit less than 40% of incident light, the transmitted light will reflect off the reflector layer and pass back through the reflection enhancing layer and the absorber layer, thereby losing at least a further 60% of incident light, resulting in less than 16% of initially incident light escaping the colour-shifting structure, thereby rendering the colour-shift effect essentially not visible over the much brighter reflective relief effect. In other words, the transmissivity of the reflection enhancing layer and the absorber layer, together, refers to the single pass transmissivity, i.e. the amount of light transmitted by light passing through the reflection enhancing layer and absorber layer once. For a colour-shifting structure to be visible, however, light must pass through the absorber layer twice, meaning that a single pass transmissivity of 40% is sufficient to render the colour-shift effect essentially invisible.

The decoupling described above can provide a pure reflective effect, such as a holographic effect, in combination with and even immediately adjacent to a coupled or decoupled colour-shifting effect and optionally also with purely reflective and/or transparent regions of the device. The combination of layers required to provide these regions will now be briefly described.

The reflective relief effect and the colour-shift effect may additionally be provided in a coupled manner by providing a partial region of the device having, in the same region, the relief structure, absorber layer (preferably conforming with the relief structure), optical spacer layer and reflector layer, i.e. without the reflection enhancing layer. Here, the absorber layer may act as an only partially reflective reflection enhancing layer, allowing the reflective relief effect to be exhibited in combination with the colour-shifting effect in this region. Alternatively, a different reflection enhancing layer may be used which, together with the absorber layer, is not opaque or transmits more than 40% of incident light.

The colour-shift effect may also be provided decoupled from the relief structure effect. This may be achieved by providing a partial region of the device with the absorber layer, optical spacer layer and the reflector layer, i.e. without the relief structure or reflection enhancing layer. Alternatively, the relief structure may be provided and nullified by coating in a non-conformal layer having a refractive index matching the refractive index of the substrate to cancel out the effect of the relief structure.

Also, purely reflective regions may be formed in the device by providing a partial region with the reflection enhancing and absorber layers, i.e. without the relief structure or with the relief structure nullified, as described above. Alternatively, they may be provided by regions having only the reflector layer, again, without the relief structure or with the relief structure nullified.

Finally, purely transparent regions may be used by providing a partial region of the device without any of the reflection enhancing layer, absorber layer or reflector layer, and with the relief structure either not provided or nullified, as described above.

In some embodiments, the relief structure is formed only in a part of the first surface of the substrate. This is particularly preferable where regions exhibiting a (solely) decoupled colour-shift effect are desired, or where purely reflective or transparent regions are desired (i.e. planar regions). Alternatively, the relief structure may be formed over substantially the entire first surface of the substrate. So that a decoupled colour-shift effect may be exhibited by the device, preferably the first region comprises at least some of the first surface of the substrate that does not have the relief structure, and further preferably the first region comprises a majority of the first surface of the substrate, preferably substantially all of the first surface of the substrate, that does not have the relief structure. To produce the decoupled colour-shift effect, the absorber layer, optical spacer layer and reflector layer should all be provided at least over a portion of the first region not having the relief structure.

Where the relief structure is formed only in a part of the first surface of the substrate, and where mutually decoupled effects are desired, preferably the method comprises applying the reflection enhancing layer to the first surface of the substrate such that the reflection enhancing layer entirely overlaps the relief structure. In contrast, where a partial region exhibiting coupled effects is desired, the method may comprise applying the reflection enhancing layer to the first surface of the substrate such that the reflection enhancing layer only partially overlaps the relief structure.

A particularly preferably way in which the reflection enhancing layer may be applied is by applying a soluble mask over a part of the first surface of the substrate, applying the reflection enhancing layer over the first surface of the substrate and over the soluble mask, and removing the soluble mask, wherein removing the soluble mask also removes the reflection enhancing layer where the reflection enhancing layer has been applied over the soluble mask.

Providing the reflection enhancing material and absorber layer of the same, typically metallic, material has the additional advantageous effect of preventing galvanic corrosion, which otherwise occurs between two different metals in close proximity. As a result, in particularly preferable embodiments of the invention, the absorber layer is applied directly on to (i.e. in contact with) the reflection enhancing layer.

This essentially means that the colour-shifting structure can be provided immediately adjacent to the reflective relief structure, leading to a potentially thinner security device.

Some embodiments comprise applying the absorber layer so as to entirely overlap the reflection enhancing layer. This ensures that the effect produced by the reflective relief structure is decoupled from the colour-shift effect wherever the reflection enhancing layer is present.

As mentioned above, it is possible to provide the two effects coupled in a region of a device. This can be achieved by applying the absorber layer so as to at least partially overlap (preferably in contact with) the relief structure where the relief does not have the reflection enhancing layer. As described above, the absorber layer may act as an only partially reflective reflection enhancing layer, allowing the reflective relief effect to be exhibited in combination with the colour-shifting effect in this region.

In some embodiments, the absorber layer is applied over substantially the entire first surface of the substrate. Such embodiments simplify the manufacturing process. However, preferably, applying the absorber layer comprises applying a soluble mask over a part of the first surface of the substrate and the reflection enhancing layer, applying the absorber layer over the first surface of the substrate and the reflection enhancing layer and over the soluble mask, and removing the soluble mask, wherein removing the soluble mask also removes the absorber layer where the absorber layer has been applied over the soluble mask. This allows the absorber layer to be applied in accordance with a pattern or design, allowing features such as full or half windows to additionally be provided in the security device.

In many embodiments, a thickness of the reflection enhancing layer is greater than a thickness of the absorber layer. Providing the reflection enhancing layer thicker than the absorber layer allows the combination of the two layers to be substantially opaque or at least weakly transmissive, while permitting the absorber layer on its own to retain a good degree of partial reflectivity. Indeed, it is desirable that the absorber layer reflects less than approximately 30% of incident light, while the combination of the two layers may approach upto 100% opacity, and this is best provided by a reflector layer thicker than the absorber layer.

Preferably the absorber layer and/or the reflector layer have substantially constant thicknesses, to provide the security device with a consistent appearance across each of the coupled and decoupled regions.

The optical spacer layer cooperates with the absorber layer, and the reflector layer, to form the colour-shifting structure, and so typically, the optical spacer layer is applied so as to entirely overlap the absorber layer. For example, this may be achieved by applying the optical spacer layer over substantially the entire first surface of the substrate. Similarly, the reflector layer will typically be applied so as to entirely overlap the absorber layer, preferably the reflector layer matching the absorber layer. In some embodiments, however, the reflector layer is applied over substantially the entire first surface of the substrate.

Preferably, the absorber layer and reflector layer are applied in register with one another. Further preferably, the reflection enhancing layer, absorber layer and reflector layer are applied in register with one another. This allows the location of the decoupled and coupled regions and transparent and reflective regions to be precisely configured, preferably with instantaneous changes between these regions. Alternatively, the layers may be applied so as to deliberately produce gradual changes between these regions. For example, in some embodiments, at least a portion of the reflection enhancing layer is provided in accordance with a halftone pattern, e.g. having discrete elements that vary in size and/or spacing. In these embodiments, a gradual transition from a decoupled reflective relief effect to a coupled or decoupled colour-shift effect may be provided, e.g. by providing the absorber layer over the entire area of the halftone pattern. Alternatively, or in addition, the absorber layer may be provided at least partly in accordance with the same or a different halftone pattern to provide a gradual transitions from a decoupled (reflective or colour-shift) or coupled region of the device into, for example, a transparent region of the device. These various options will be described in more detail below.

In many embodiments, applying the reflector layer comprises applying a soluble mask over a part of the first surface of the substrate, the reflection enhancing layer, the absorber layer and the optical spacer layer, applying the reflector layer over the first surface of the substrate, the reflection enhancing layer, the absorber layer and the optical spacer layer, and over the soluble mask, and removing the soluble mask, wherein removing the soluble mask also removes the reflector layer where the reflector layer has been applied over the soluble mask. Alternatively, applying the reflector layer may comprise applying the reflector layer over the optical spacer layer, applying a resist over a part of the reflector layer and removing the reflector layer where the reflector layer is not covered by the resist.

As discussed above, preferably the device comprises at least one transparent region, wherein none of reflection enhancing layer, the absorber layer or the reflector layer are provided in the at least one transparent region. Preferably the at least one transparent region is provided at an edge of the security device, as this has been found to help with integrating the security device into an article, such as a security document, by providing some disguise of the edge of the security device. In some embodiments, first and second transparent regions are provided at opposing edges of the security device. This is particularly preferable where the security device is a security stripe or patch. In other cases, the transparent region will be provided on all lateral edges or about a perimeter of the security device.

Transparent regions may be otherwise utilised in the security device, for example, at least one transparent region may be provided in accordance with an indicium, such as an alphanumeric character or symbol. This transparent region may be provided in the body of the security device, i.e. away from the edges, breaking up the coupled or decoupled effects and providing additional authentication means.

As mentioned above, preferably the relief structure is a diffractive relief structure, such as a hologram. A diffractive relief structure may be formed by embossing or cast-curing a diffractive relief structure in the surface of the substrate, as is well known in the art.

Another advantage of the present invention is that it may be performed in-line on a continuous web of substrate. Therefore, preferably, two or more (preferably all) of the steps of applying the reflection enhancing layer, applying the absorber layer, applying the optical spacer layer and applying the reflector layer are performed in an in-line process. Applying these layers in-line can help simplify the manufacturing process, increase production speed, reduce production cost and achieve improved interlayer adhesion and durability.

In accordance with a second aspect of the present invention, there is provided a security device comprising: a substrate, the substrate having opposing first and second surfaces and a relief structure formed in the first surface of the substrate; a reflection enhancing layer over the first surface of the substrate, the reflection enhancing layer at least partially overlapping the relief structure, wherein a first region of the first surface of the substrate does not have the reflection enhancing layer; an absorber layer over the reflection enhancing layer, the absorber layer at least partially overlapping the reflection enhancing layer and the relief structure where they overlap each other, and the absorber layer at least partially overlapping the first region of the first surface of the substrate; an optical spacer layer over the absorber layer, the optical spacer layer at least partially overlapping the absorber layer, reflection enhancing layer and the relief structure where they overlap each other, the optical spacer layer at least partially overlapping the absorber layer and the first region where they overlap each other; and a reflector layer, formed of an at least partially reflective material, over the optical spacer layer, the reflector layer at least partially overlapping the optical spacer layer, the absorber layer, the reflection enhancing layer and the relief structure where they overlap each other, and the reflector layer at least partially overlapping the optical spacer layer, the absorber layer and the first region where they overlap each other; wherein the reflection enhancing layer and the absorber layer are formed of the same material, wherein the absorber layer, the optical spacer layer and the reflector layer, together, form a colour-shifting structure, and wherein the reflection enhancing layer and the absorber layer, together, are substantially opaque or transmit less than 40% of incident light, preferably less than 20% of incident light.

The second aspect of the invention provides a security device suitable for manufacture in accordance with the first aspect of the present invention. The various advantages and optional or preferable features discussed above with respect to the first aspect apply equally or have equivalents in the context of this second aspect of the invention.

In accordance with a third aspect of the present invention, there is provided an article having the security device according to the second aspect, wherein, preferably, the article is selected from banknotes, cheques, passports, identity cards, certificates of authenticity, fiscal stamps and other documents for securing value or personal identity.

In accordance with a fourth aspect of the present invention, there is provided a method of manufacturing a security device comprising: providing a substrate, the substrate having opposing first and second surfaces and a relief structure formed in the first surface of the substrate; applying a first reflection enhancing layer over the first surface of the substrate such that the first reflection enhancing layer at least partially overlaps the relief structure; applying an interrupting layer over the first reflection enhancing layer in a first region such that the interrupting layer at least partially overlaps the first reflection enhancing layer and the relief structure where they overlap each other and such that the interrupting layer does not overlap the first surface of the substrate in a second region; (at least) if the first reflection enhancing layer does not overlap the second region, applying a second reflection enhancing layer over the first surface of the substrate such that the second reflection enhancing layer at least partially overlaps the second region; applying an optical spacer layer over the interrupting layer and, if provided, the second reflection enhancing layer such that the optical spacer layer at least partially overlaps the interrupting layer, the first layer of reflective material and the relief structure where they overlap each other, and such that the optical spacer layer at least partially overlaps the first or second reflection enhancing layer in the second region; and applying a reflector layer over the optical spacer layer such that the reflector layer at least partially overlaps the optical spacer layer, the interrupting layer, the first layer of reflective material and the relief structure where they overlap each other, and such that the reflector layer at least partially overlaps the optical spacer layer and the first or second layer of reflective material where they overlap each other in the second region; wherein the first and/or second reflection enhancing layers, the optical spacer layer and the reflector layer, together, form a colour-shifting structure that exhibits a colour shift in the second region as the viewing angle or angle of incident light changes, and wherein the interrupting layer interrupts the colour shift in the first region.

The method according to this aspect of the present invention allows a security device to be produced for which either the reflection enhancing layer of the reflective relief structure also acts as the absorber layer of the colour-shifting structure, thereby providing a more integrated appearance, or the interrupting layer isolates the reflection enhancing layer, allowing free choice of the material to be used as the absorber layer of the colour-shifting coating structure.

In either case, what is produced is a security device that exhibits two identifiably different optical effects that have a more integrated appearance than similar devices known in the art. Such a device can prove difficult to reverse engineer and counterfeit by more sophisticated counterfeiting techniques.

The method according to this aspect of the invention comprises applying a first reflection enhancing layer over the first surface of the substrate, preferably in contact with the substrate, such that it partially overlaps or coats the relief structure in reflection enhancing material. The reflection enhancing layer may be provided as a conformal or nonconformal coating to the relief structure. Again, it will be appreciated that both a conformal and nonconformal coating will typically substantially conform to the relief structure in the surface facing the relief structure in order to improve the optical effect of the relief structure. Conformal and nonconformal coatings may differ in whether or not the surface facing away from the relief structure also conforms to the relief structure.

The first reflection enhancing layer, applied to at least some of the relief structure, completes the reflective relief structure, such that a reflective relief effect, such as a diffractive or holographic effect will be exhibited by the finished security device.

The interrupting layer is then applied over the relief structure coated with reflection enhancing material to define a decoupled reflective relief region, preferably by providing it in contact with the first reflection enhancing layer. That is to say, wherever the interrupting layer is provided, the relief structure coated with reflection enhancing material will exhibit a decoupled reflective relief effect in the final security device. The various mechanisms by which an interrupting layer may decouple the two effects will be described in more detail below.

In many embodiments, the interrupting layer will not entirely cover the first reflection enhancing material, and will instead leave a region of the first reflection enhancing material uncovered to act as an absorber layer for the colour-shifting structure in the final security device. In these cases, the uncovered first reflection enhancing layer may be provided on one or both of relief structure regions and substantially flat regions to provide either or both of coupled and decoupled colour-shift effects respectively, as will be described in more detail below.

In cases in which the interrupting layer entirely covers the first reflection enhancing layer, a second reflection enhancing layer is applied over the device to provide a functioning absorber layer in the final device. In these cases, again, the second reflection enhancing layer may be provided on one or both of relief structure regions and substantially flat regions to provide either or both of coupled and decoupled colour-shift effects respectively, as will be described in more detail below.

In both of these cases, the first and second reflection enhancing layers will typically be formed of a partially reflecting material.

The colour-shifting structure is then completed on the reflective relief structure, over the interrupting layer (and optional second reflection enhancing layer) by providing the optical spacer layer and reflector layer. In forming the colour-shifting structure, preferably the optical spacer layer is in contact with the first or second reflection enhancing layer, and/or preferably the reflector layer is in contact with the optical spacer layer. While these three layers (first or second reflection enhancing layers, acting as an absorber layer, and optical spacer layer and reflector layer) are the minimum layers required to form a colour-shifting structure, additional layers could also be provided. For example, a second absorber layer and second optical spacer layer could be provided in order over the first optical spacer layer, i.e. between the first optical spacer layer and the reflector layer, to provide an additional boundary that will reflect light and cause interference effects.

As mentioned, this aspect of the invention provides a reflective relief effect that is deocoupled from an underlying colour shift effect by the interruption layer. This may be accompanied by either or both of coupled and decoupled colour-shift effects. A decoupled colour-shift effect is provided by regions which have the first or second reflection enhancing layers, optical spacer layer and reflector layer but no relief structure (or wherein the effect of the relief structure has been nullified) and no interrupting layer. A coupled colour-shift effect is provided by regions which have the relief structure the first or second reflection enhancing layers, optical spacer layer and reflector layer and no interrupting layer.

As with the first aspect of the present invention, in addition to the coupled and decoupled effects, the device may be provided with regions in which none of the first reflection enhancing layer, second reflection enhancing layer, and reflector layer are provided so as to additionally provide transparent regions in the security device.

Purely reflective regions could also be provided by having some partial regions with only the reflector layer and no relief structure, or wherein the relief structure has been nullified.

In many embodiments, the relief structure is formed only in a part of the first surface of the substrate. This is particularly preferable where regions exhibiting a decoupled colour-shift effect are desired, or where purely reflective or transparent regions are desired. Alternatively, the relief structure may be formed over substantially the entire first surface of the substrate. So that a decoupled colour-shift effect may be exhibited by the device, preferably the second region comprises at least some of the first surface of the substrate that does not have the relief structure, and further preferably the second region comprises substantially all of the first surface of the substrate that does not have the relief structure.

In some embodiments, the first reflection enhancing layer is applied to the first surface of the substrate such that the first reflection enhancing layer entirely overlaps the relief structure, and some embodiments comprise applying the first reflection enhancing layer over substantially the entire first surface of the substrate.

Alternatively, the method may comprise applying the first reflection enhancing layer to the first surface of the substrate such that the first reflection enhancing layer only partially overlaps the relief structure.

In either of the above alternatives, where mutually decoupled effects are desired, the interrupting layer may be applied to entirely overlap the relief structure, or to match the relief structure. Alternatively, where a partial region exhibiting coupled effects is desired, the method may comprise applying the reflection enhancing layer to the first surface of the substrate such that the reflection enhancing layer only partially overlaps the relief structure. In some cases, this may comprise applying the interrupting layer such that the interrupting layer entirely overlaps the first reflection enhancing layer. This can be achieved, for example, by applying the first reflection enhancing layer to the first surface of the substrate, applying the interrupting layer over the first reflection enhancing layer, and removing the first reflection enhancing layer where the first reflection enhancing layer is not covered by the interrupting layer, for example by etching. Alternatively, the interrupting layer may only partially overlap the first reflection enhancing layer; for example, it may not extend beyond the first reflection enhancing layer.

As mentioned, the purpose of the interrupting layer is to interrupt the colour-shift effect that would otherwise be produced by the colour-shifting structure in a partial region of the device. One way in which the interrupting layer may interrupt the colour-shift effect is when a thickness of the interrupting layer is greater than a thickness of the optical spacer layer. For example, the interrupting layer may be provided with a thickness of 0.5 µm to 5 µm, preferably of 1 µm to 2 µm. In such cases, the thickness of the interrupting layer suppresses or prevents entirely any thin-film interference that provides colour-shifting structures with their colour-shift effect. Because this mechanism is independent of the colour or opacity of the interrupting layer, it is possible to provide the interrupting layer as substantially transparent or translucent, which can prevent the interrupting layer imposing itself on the appearance of security device. Alternatively the interrupting layer, or the first reflection enhancing layer and the interrupting layer together, may be substantially opaque, so as to interrupt the colour-shift effect.

Advantageously, the interrupting layer of the present invention may be applied by printing the interrupting layer. The interrupting layer may comprise an ink. Printing the interruption layer is particularly preferable, as this is a relatively simple process that can accurately and precisely be performed as part of an in-line process.

As mentioned above, the first reflection enhancing layer and the second reflection enhancing layer may be formed of different materials. This can provide greater design freedom, or allow the appearance of corresponding regions to be configured so as to produce a more integrated appearance.

Because the second material will be separated from the first material by the interrupting layer, it is possible to apply the second reflection enhancing layer over substantially the entire first surface of the substrate. This may aid in simplifying manufacture of the security device. Alternatively, applying the second reflection enhancing layer may comprise applying a soluble mask over a part of the first surface of the substrate, the first reflection enhancing layer and the interrupting layer, applying the second reflection enhancing layer over the first surface of the substrate, the first reflection enhancing layer and the interrupting layer, and over the soluble mask, and removing the soluble mask, wherein removing the soluble mask also removes the second reflection enhancing layer where the second reflection enhancing layer has been applied over the soluble mask. In such embodiments, regions having and not having the second reflection enhancing layer may be provided, which is particularly preferable when transparent regions are desired.

Some embodiments then comprise applying the optical spacer layer over substantially the entire first surface of the substrate, which will include applying it over the interruption layer.

Further, the method may include applying the reflector layer over substantially the entire first surface of the substrate. Alternatively, applying the reflector layer may comprise applying a soluble mask over a part of the first surface of the substrate, the first reflection enhancing layer, the interrupting layer, the second reflection enhancing layer, if provided, the absorber layer, and the optical spacer layer, applying the reflector layer over the first surface of the substrate, the first reflection enhancing layer, the interrupting layer, the second reflection enhancing layer, if provided, the absorber layer, and the optical spacer layer, and over the soluble mask, and removing the soluble mask, wherein removing the soluble mask also removes the reflector layer where the reflector layer has been applied over the soluble mask. In another alternative, applying the reflector layer comprises applying the reflector layer over the over the optical spacer layer, applying a resist over a part of the reflector layer, and removing the reflector layer where the reflector layer is not covered by the resist.

As mentioned above, some embodiments may comprise at least one transparent region, wherein none of the first reflection enhancing layer, the second reflection enhancing layer, the absorber layer or the reflector layer are provided in the at least one transparent region. Preferably the at least one transparent region is provided at an edge of the security device, as this has been found to help with integrating the security device into an article, such as a security document, by providing some disguise of the edge of the security device. In some embodiments, first and second transparent regions are provided at opposing edges of the security device. This is particularly preferable where the security device is a security thread or stripe. In other cases, the transparent region will be provided on all lateral edges of the security device.

Transparent regions may be otherwise utilised in the security device, for example, at least one transparent region may be provided in accordance with an indicium, such as an alphanumeric character or symbol. This transparent region may be provided in the body of the security device, i.e. away from the edges, breaking up the coupled or decoupled effects and providing additional authentication means.

Preferably the relief structure is a diffractive relief structure, such as a hologram produced by optically interferometry or non-interferometric optical lithography or non-interferometric electron beam lithography. A diffractive relief structure may be formed by embossing or cast-curing a diffractive relief structure in the surface of the substrate, as is well known in the art.

Another advantage of the present invention is that it may be performed in-line on a continuous web of substrate. Therefore, preferably, two or more (preferably all) of the steps of applying the first reflection enhancing layer, applying the interrupting layer, applying the second reflection enhancing layer, applying the optical spacer layer, and applying the reflector layer are performed in an in-line process.

According to a fifth aspect of the present invention there is provided a security device comprising: a substrate, the substrate having opposing first and second surfaces and a relief structure formed in the first surface of the substrate; a first reflection enhancing layer over the first surface of the substrate, the first reflection enhancing layer at least partially overlapping the relief structure; an interrupting layer over the first reflection enhancing layer in a first region, the interrupting layer at least partially overlapping the first reflection enhancing layer and the relief structure where they overlap each other, and the interrupting layer not overlapping the first surface of the substrate in a second region; if the first reflection enhancing layer does not overlap the second region, a second reflection enhancing layer over the first surface of the substrate, the second reflection enhancing layer at least partially overlapping the second region; an optical spacer layer over the interrupting layer and, if provided, the second reflection enhancing layer, the optical spacer layer at least partially overlapping the interrupting layer, the first layer of reflective material and the relief structure where they overlap each other, and the optical spacer layer at least partially overlapping the first or second reflection enhancing layer in the second region; and a reflector layer over the optical spacer layer, the reflector layer at least partially overlapping the optical spacer layer, the interrupting layer, the first layer of reflective material and the relief structure where they overlap each other, and the reflector layer at least partially overlapping the optical spacer layer and the first or second layer of reflective material where they overlap each other in the second region; wherein the first and/or second reflection enhancing layers, the optical spacer layer and the reflector layer, together, form a colour-shifting structure that exhibits a colour shift in the second region as the viewing angle or angle of incident light changes, and wherein the interrupting layer interrupts the colour shift in the first region.

The fifth aspect of the invention provides a security device suitable for manufacture in accordance with the fourth aspect of the present invention. The various advantages and optional or preferable features discussed above with respect to the fourth aspect apply equally or have equivalent features in the context of this fifth aspect of the invention.

In accordance with a sixth aspect of the present invention there is provided an article having the security device according to the fifth aspect, wherein, preferably, the article is selected from banknotes, cheques, passports, identity cards, certificates of authenticity, fiscal stamps and other documents for securing value or personal identity.

BRIEF DESCRIPTION OF THE DRAWINGS

FIG. 1 shows, schematically, a front view of a security document having a security device according to a first embodiment;

FIGS. 2A to 2G show, schematically, respective cross-sectional views of a security device according to the first embodiment of the invention at seven different stages during manufacture;

FIG. 3 shows, schematically, a front view of a security document having a security device according to a second embodiment;

FIGS. 4A to 4G show, schematically, respective cross-sectional views of a security device according to the second embodiment of the invention at seven different stages during manufacture;

FIG. 5 shows, schematically, a front view of a security document having a security device according to a third embodiment;

FIGS. 6A to 6G show, schematically, respective cross-sectional views of a security device according to the third embodiment of the invention at seven different stages during manufacture;

FIGS. 8A to 8K show, schematically, respective cross-sectional views of a security device according to the fourth embodiment of the invention at eleven different stages during manufacture;

FIGS. 9A to 9D show, schematically, respective cross-sectional views of a security device according to a fifth embodiment of the invention at four stages during manufacture;

FIG. 14 shows, schematically, a front view of a security document having a security device according to a seventh embodiment;

FIGS. 15A to 15E show, schematically, respective cross-sectional views of a security device according to the seventh embodiment of the invention at five different stages during manufacture;

FIG. 16 shows, schematically, a front view of a security document having a security device according to an eighth embodiment;

FIGS. 17A to 17E show, schematically, respective cross-sectional views of a security device according to the eighth embodiment of the invention at five different stages during manufacture;

FIG. 18 shows, schematically, a front view of a security document having a security device according to a ninth embodiment; and FIGS. 19A to 19I show, schematically, respective cross-sectional views of a security device according to the ninth embodiment of the invention at nine different stages during manufacture.

DETAILED DESCRIPTION

Figure 2C:
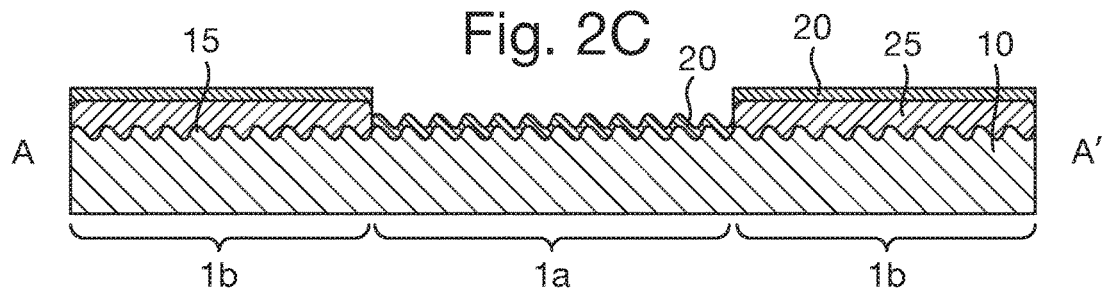

Various embodiments according to the first to third aspects of the invention will now be described. A first embodiment of the invention will be described with reference to FIGS. 1 to 2G.

FIG. 1 shows a security article, in this case a security document 100, having a security device 1 on one surface. The way in which security devices according to the invention may be incorporated into articles, such as this security document, will be discussed in more detail below. The security device 1 has two distinct regions 1a, 1b. In a central region 1a, the security device exhibits a decoupled diffractive effect. In an outer region 1b (the first region mentioned above with reference to the first aspect of the invention), the security device exhibits coupled diffractive and colour-shift effects. These distinct regions are achieved using the multilayer system shown in cross-section along line A-A' at various stages during manufacture in FIGS. 2A to 2G.

FIG. 2A shows a substrate 10, which in this embodiment, forms the supporting layer of the security device. The substrate 10 is made of a substantially transparent material to allow the finished security device to be viewed through the substrate 10. While the substrate is transparent in this embodiment, and the embodiments discussed below, alternatively a substrate carrying a coloured tint could be used to further integrate the appearance of the two regions 1a, 1b. The substrate 10 has opposing first and second surfaces 10a, 10b. The first surface 10a has formed therein a diffractive relief structure 15. In this embodiment, the diffractive relief structure 15 covers the entire first surface of the substrate 10. While in this embodiment the substrate 10 is a self-supporting layer, in many other embodiments, this substrate may not be self-supporting and the substrate may instead be held on a more substantial supporting layer (not shown).

FIG. 2B shows the substrate 10 following the application of a masking layer 25 to the relief structure 15 to form a mask. The masking layer 25 is applied such that a central region 1a does not have the masking layer 25. Where the resist is applied corresponds to the outer region 1b of the final security device. The masking layer may be selected from any suitable soluble masking layers widely known in the art. Preferably, however, the masking layer is a water soluble masking layer.

FIG. 2C shows the structure of FIG. 2B after application of a reflection enhancing layer 20. In this case, the reflection enhancing layer is applied over the relief structure 15 and the masking layer 25 such that the reflection enhancing layer 20 is received directly on the relief structure 15 in the central region, i.e. where it is not covered by the masking layer, and such that it is received on the masking layer 25 where the masking layer is provided. The reflection enhancing layer 20 may be applied by standard deposition processes known in the art, such as vacuum deposition (encompassing sputtering, resistive boat evaporation or electron beam evaporation for example), or by chemical vapour deposition. In this embodiment, the reflection enhancing layer forms a conformal coating on the relief structure 15 in the central region 1a. The reflection enhancing material may be selected from reflective materials known in the art and suitable for use in a colour-shifting structure as an absorber layer. Some suitable examples include Al, Cr, Ni or alloys such as Nichrome.

Figure 2D:
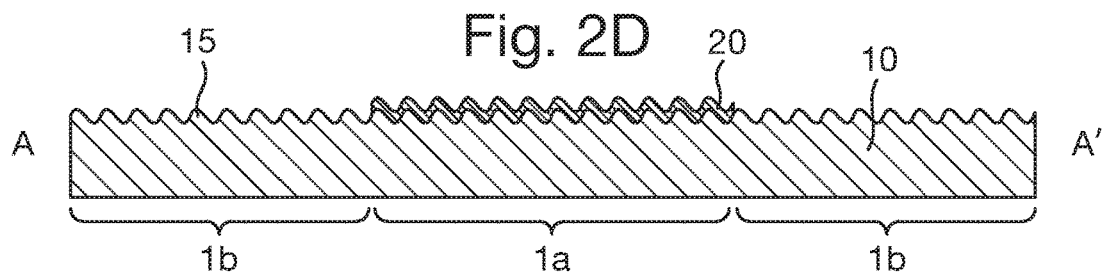

FIG. 2D shows the structure of FIG. 2C after removal of the masking layer 25 by washing in the appropriate solvent. The result is the substrate 10 having a reflection enhancing layer provided on the relief structure in the central region 1a. In the outer region 1b, however, the relief structure is uncoated.

Figure 2E:
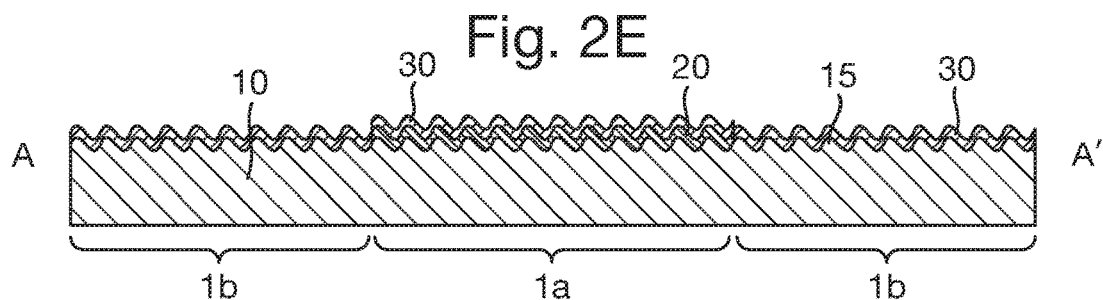

FIG. 2E shows the structure of FIG. 2D after application of an absorber layer 30. The absorber layer 30 is formed of the same material as the reflection enhancing layer, which allows the absorber layer to be applied in contact with the reflection enhancing layer 20, without risk of galvanic corrosion effects. This is not essential however, and instead an intermediate layer may be applied between the reflection enhancing layer and the absorber layer, if desired. Again, the absorber layer may be applied by standard deposition processes known in the art, such as vacuum deposition or chemical deposition. The absorber layer 30 is received on the reflection enhancing layer 20 in the central region 1a, again conforming to the relief structure in this embodiment, and also received directly on the relief structure 15 in the outer region 1b, conforming to the relief structure in the outer region.

The thicknesses of the reflection enhancing layer 20 and the absorber layer 30 are selected such that in the central region 1a, where both layers are present, the layers in combination are substantially opaque or at least weakly transmissive, and such that in the outer region, where only the absorber layer 30 is present, the absorber layer is only partially reflective, i.e. highly transmissive. In particular, ideally, the thickness of the absorber layer will be selected such that, in the outer region 1b, the absorber layer reflects or absorbs less than approximately 30% of incident light. In the central region 1a, the reflection enhancing layer may be provided with a thickness that, in combination with the thickness of the absorber layer, transmits less than 25% of incident light. Typically this will mean that the reflection enhancing layer 20 is provided with a greater thickness than the absorber layer 30. As a specific example, the absorber layer may be 4 to 6 nm and comprised of Chrome and the reflection enhancing layer may also be Chrome with a thickness equal to or greater than the absorber layer i.e. 5 to 30 nm. As described above, the layer thicknesses may be configured such that, together, the absorber layer and reflection enhancing layer are substantially opaque, or such that they transmit less than 40% of incident light, preferably less than 20% of incident light.

Figure 2F:
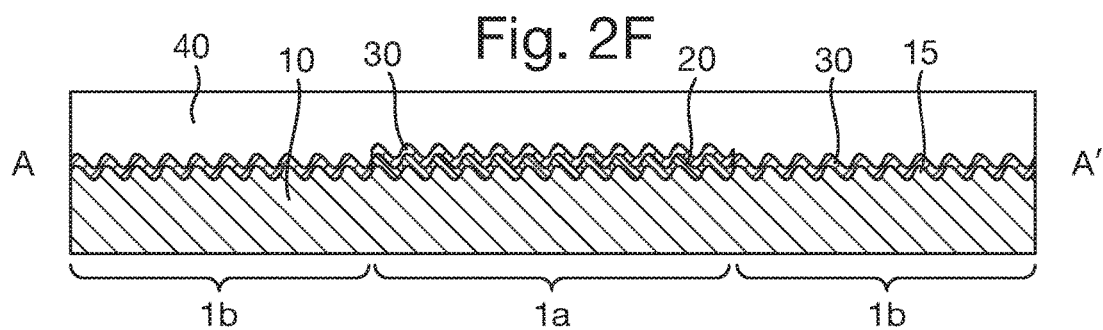

FIG. 2F shows the structure of FIG. 2E following the application of an optical spacer layer 40. The optical spacer layer is applied entirely over the absorber layer, which at this stage during manufacture coats the entire uppermost surface of the incomplete security device. The optical spacer layer may be selected from suitable dielectric materials well known in the art, and is preferably an organic spacer layer applied in liquid form. Example systems would include unsaturated resins or monomers, pre-polymers, oligomers etc. containing vinyl or acrylate unsaturation for example and which cross-link through use of a photo initiator activated by the radiation source employed e.g. UV. The thickness of the optical spacer layer will typically be in the range 100 to 400 nm.

Figure 2G:
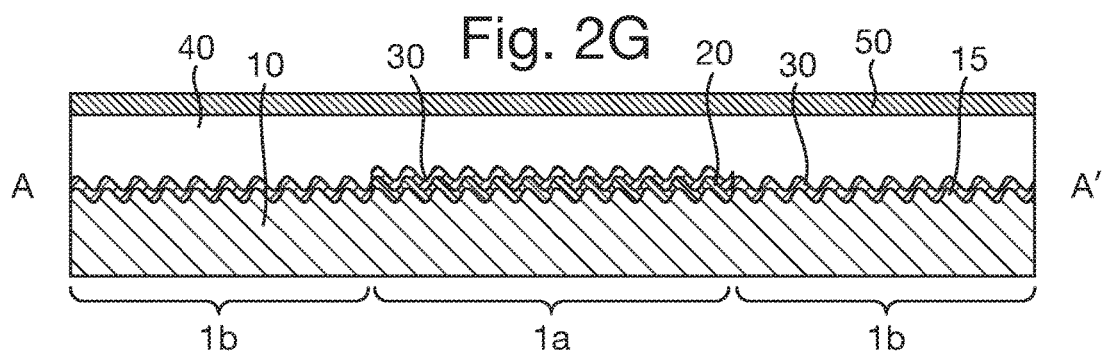

Finally, FIG. 2G shows the structure of FIG. 2F after application of a reflector layer 50, i.e. the completed security device. In this embodiment, the reflector layer is applied over the entire upper surface of the optical spacer layer. The reflector layer may be selected from reflective materials known in the art and suitable for use in a colour-shifting structure as a reflector layer. Such materials are typically substantially entirely reflective, but may also be only partially reflective. In this embodiment, a fully reflective, 40 nm thick aluminium coating is used as the reflector layer. The reflector layer may be applied by standard deposition processes known in the art, such as vacuum deposition or chemical deposition.

The resulting security device is typically viewed in reflection. The security device will therefore be oriented such that the reflection enhancing layer 20, absorber layer 30, optical spacer layer 40 and reflector layer 50 are viewed through the substrate 10. As described above, when this device is viewed in reflection, the central region 1a will exhibit a decoupled diffractive effect as the reflection enhancing layer 20 and the absorber layer 30, together, reflect substantially all light incident in the central region, preventing the colour-shifting structure from producing the thin-film interference that generates the colour-shift effect. On the other hand, the outer region, when viewed in reflection, will exhibit coupled diffractive and colour-shift effects as the absorber layer acts to reflect only a portion of the incident light, allowing some of the incident light to pass through to the body of the colour-shifting structure.

A second embodiment of the invention will now be described with reference to FIGS. 3 to 4G.

FIG. 3 shows a security article, in this case a security document 100, having a security device 1 on one surface. The security device 1 has two distinct regions 1a, 1c. In the central region 1a, the security device exhibits a decoupled diffractive effect. In the outer region 1c (first region, mentioned above), the security device exhibits a decoupled colour-shift effect. These distinct regions are achieved using the multilayer system shown in cross-section along line B-B' at various stages during manufacture in FIGS. 4A to 4G.

FIG. 4A shows a substrate 10, which forms the supporting layer of the security device. The substrate 10 is made of a substantially transparent material to allow the finished security device to be viewed through the substrate 10. The substrate 10 has opposing first and second surfaces 10a, 10b. The first surface 10a has formed therein a diffractive relief structure 15. In this embodiment, the diffractive relief structure 15 covers the only a part of the first surface of the substrate 10, specifically, the central region 1a of the security device. The remaining outer region 1c is provided as a substantially flat surface of the substrate 10.

FIG. 4B shows the substrate 10 following the application of a masking layer 25 to the relief structure 15 to form a mask. The masking layer 25 is applied such that the central region 1a, i.e. the relief structure, does not have the masking layer 25 and such that the outer region 1c, i.e. the substantially flat region, does have the masking layer. As above, preferably the masking layer is a water soluble masking layer.

FIG. 4C shows the structure of FIG. 4B after application of a reflection enhancing layer 20. In this case, the reflection enhancing layer is applied over the relief structure 15 and the masking layer 25 such that the reflection enhancing layer 20 is received directly on the relief structure 15 in the central region, and such that it is received on the masking layer 25 where the masking layer is provided. As above, the reflection enhancing layer 20 may be applied by standard deposition processes known in the art, such as vacuum deposition, or by chemical vapour deposition. In this embodiment, the reflection enhancing layer forms a conformal coating on the relief structure 15 in the central region 1a.

FIG. 4D shows the structure of FIG. 4C after removal of the masking layer 25 by washing in the appropriate solvent. The result is the substrate 10 having a reflection enhancing layer provided on the relief structure in the central region 1a. In the outer region 1c, the substantially flat surface of the substrate 10 remains uncoated.

FIG. 4E shows the structure of FIG. 4D after application of an absorber layer 30. The absorber layer 30 is again formed of the same material as the reflection enhancing layer. The absorber layer may be applied by standard deposition processes known in the art, such as vacuum deposition or chemical deposition. The absorber layer 30 is received on the reflection enhancing layer 20 in the central region 1a, again conforming to the relief structure in this embodiment, and also received directly on the substantially flat surface of the substrate 10 in the outer region 1c.

As above, the thicknesses of the reflection enhancing layer 20 and the absorber layer 30 are selected such that in the central region 1a, where both layers are present, the layers in combination are substantially opaque or at least weakly transmissive, and such that in the outer region, where only the absorber layer 30 is present, the absorber layer is not substantially opaque of weakly transmissive.

FIG. 4F shows the structure of FIG. 4E following the application of an optical spacer layer 40. The optical spacer layer is applied entirely over the absorber layer, which at this stage during manufacture coats the entire uppermost surface of the incomplete security device. The materials and thicknesses discussed above with respect to the first embodiment apply equally to this embodiment. Finally, FIG. 4G shows the structure of FIG. 4F after application of a reflector layer 50, i.e. the completed security device. In this embodiment, the reflector layer is applied over the entire upper surface of the optical spacer layer.

As described above, when this device is viewed in reflection, the central region 1a will exhibit a decoupled diffractive effect as the reflection enhancing layer 20 and the absorber layer 30, together, reflect substantially all light incident in the central region, preventing the colour-shifting structure from producing the thin-film interference that generates the colour-shift effect. On the other hand, the outer region, when viewed in reflection, will exhibit a decoupled colour-shift effect as a colour-shifting structure exists (formed of the absorber layer, optical spacer layer and reflector layer) without any relief structure being present.

A third embodiment of the invention will now be described with reference to FIGS. 5 to 6G.

FIG. 5 shows a security article, in this case a security document 100, having a security device 1 on one surface. The security device 1 has three distinct regions 1a, 1b, 1c. In the central region 1a, the security device exhibits a decoupled diffractive effect. In a first intermediate region 1b, the security device exhibits coupled diffractive and colour-shift effects. Finally, in an outer region 1c, the security device exhibits a decoupled colour-shift effect. The first intermediate region 1b and the outer region 1c do not have the reflection enhancing layer, and together form the "first region" mentioned above. These distinct regions are achieved using the multilayer system shown in cross-section along line C-C' at various stages during manufacture in FIGS. 6A to 6G.

FIG. 6A shows a substrate 10, which forms the supporting layer of the security device. The substrate 10 is made of a substantially transparent material to allow the finished security device to be viewed through the substrate 10. The substrate 10 has opposing first and second surfaces 10a, 10b. The first surface 10a has formed therein a diffractive relief structure 15. In this embodiment, the diffractive relief structure 15 covers what will form the central and first intermediate regions 1a, 1b of the final security device. The remaining outer region 1c is provided as a substantially flat surface of the substrate 10.

FIG. 6B shows the substrate 10 following the application of a masking layer 25 to the relief structure 15 to form a mask. The masking layer 25 is applied such that the central region 1a, i.e. a central portion of the relief structure, does not have the masking layer 25 and such that the first intermediate region 1b and outer region 1c, i.e. an outer portion of the relief structure and the substantially flat region of the substrate, do have the masking layer. As above, preferably the masking layer is a water soluble masking layer.

FIG. 6C shows the structure of FIG. 6B after application of a reflection enhancing layer 20. In this case, the reflection enhancing layer is applied over the relief structure 15 and the masking layer 25 such that the reflection enhancing layer 20 is received directly on the relief structure 15 in the central region 1a, and such that it is received on the masking layer 25 where the masking layer is provided, i.e. in the first intermediate region 1b and the outer region 1c. As above, the reflection enhancing layer 20 may be applied by standard deposition processes known in the art, such as vacuum deposition, or by chemical vapour deposition. In this embodiment, the reflection enhancing layer forms a conformal coating on the relief structure 15 in the central region 1a.

FIG. 6D shows the structure of FIG. 6C after removal of the masking layer 25 by washing in the appropriate solvent. The result is the substrate 10 having a reflection enhancing layer provided on the relief structure 15 in the central region 1a. In the first intermediate region 1b, however, the relief structure does not have the reflection hancing layer, while similarly the outer region 1c, i.e. the substantially flat surface of the substrate 10, remains uncoated.

FIG. 6E shows the structure of FIG. 6D after application of an absorber layer 30. The absorber layer 30 is again formed of the same material as the reflection enhancing layer 20. The absorber layer may be applied by standard deposition processes known in the art, such as vacuum deposition or chemical deposition. The absorber layer 30 is received on the reflection enhancing layer 20 in the central region 1a, again conforming to the relief structure in this embodiment. The absorber layer is also received directly on the relief structure in the first intermediate region 1b, and on the substantially flat surface of the substrate 10 in the outer region 1c.

Again, the thicknesses of the reflection enhancing layer 20 and the absorber layer 30 are selected such that in the central region 1a, where both layers are present, the layers in combination are substantially opaque or at least weakly transmissive, and such that in the intermediate 1b and outer region 1c, where only the absorber layer 30 is present, the absorber layer is not substantially opaque or weakly transmissive.

FIG. 6F shows the structure of FIG. 6E following the application of an optical spacer layer 40. The optical spacer layer is applied entirely over the absorber layer, which at this stage during manufacture coats the entire uppermost surface of the incomplete security device. The materials and thicknesses discussed above with respect to the first embodiment apply equally to this embodiment.

Finally, FIG. 6G shows the structure of FIG. 6F after application of a reflector layer 50, i.e. the completed security device. In this embodiment, the reflector layer is applied over the entire upper surface of the optical spacer layer.

As described above, when this device is viewed in reflection, the central region 1a will exhibit a decoupled diffractive effect as the reflection enhancing layer 20 and the absorber layer 30, together, reflect substantially all light incident in the central region, preventing the colour-shifting structure from producing the thin-film interference that generates the colour-shift effect. The first intermediate region when viewed in reflection, will exhibit coupled diffractive and colour-shift effects as the absorber layer acts to reflect only a portion of the incident light, allowing some of the incident light to pass through to the body of the colour-shifting structure. Finally, the outer region 1c, when viewed in reflection, will exhibit a decoupled colour-shift effect as a colour-shifting structure exists (formed of the absorber layer, optical spacer layer and reflector layer) without any relief structure being present.

A fourth embodiment of the invention will now be described with reference to FIGS. 7 to 8K.

Figure 7:
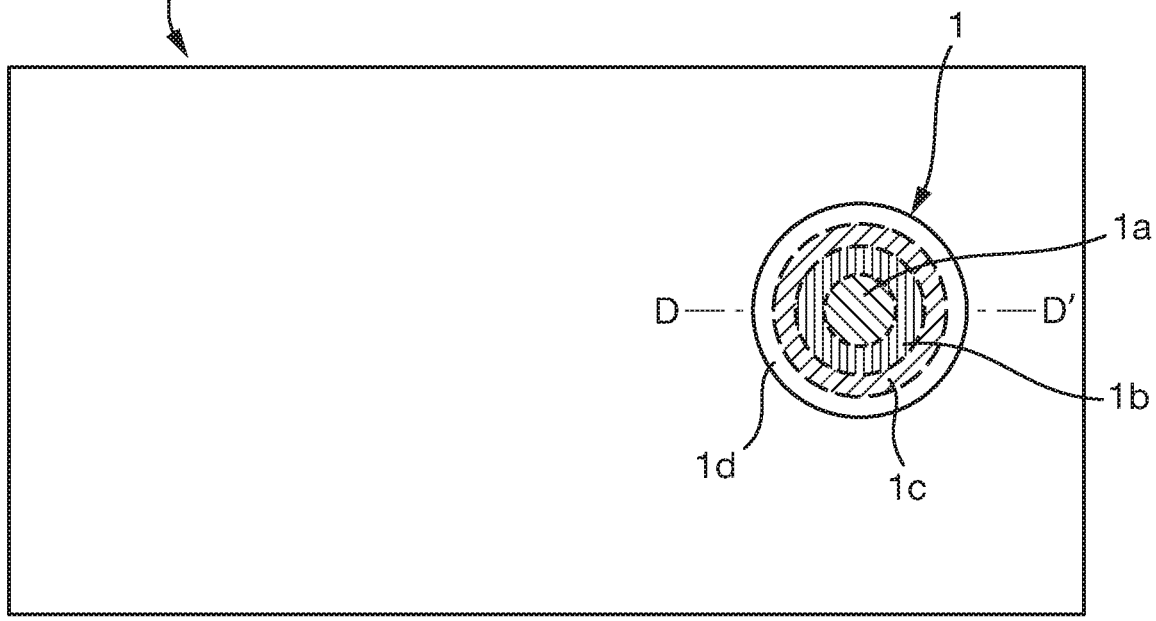
FIG. 7 shows, schematically, a front view of a security document having a security device according to a fourth embodiment.

FIG. 7 shows a security article, in this case a security document 100, having a security device 1 on one surface. The security device 1 has four distinct regions 1a, 1b, 1c, 1d. In the central region 1a, the security device exhibits a decoupled diffractive effect. In a first intermediate region 1b, the security device exhibits coupled diffractive and colour-shift effects. In a second intermediate region 1c, the security device exhibits a decoupled colour-shift effect. Finally, in the outer region 1d the security device is substantially transparent. The first intermediate region 1b, second intermediate region 1c and the outer region 1d do not have the reflection enhancing layer 20, and together form the "first region" mentioned above. These distinct regions are achieved using the multilayer system shown in cross-section along line D-D' at various stages during manufacture in FIGS. 8A to 8K.

Figure 8A:
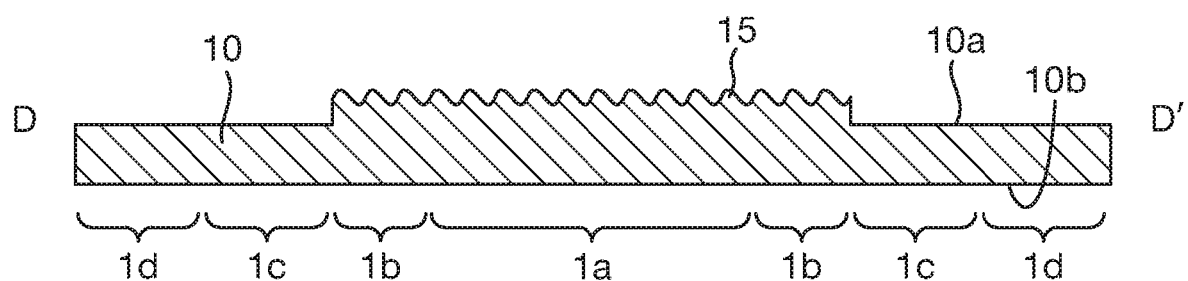
Figure 8B:
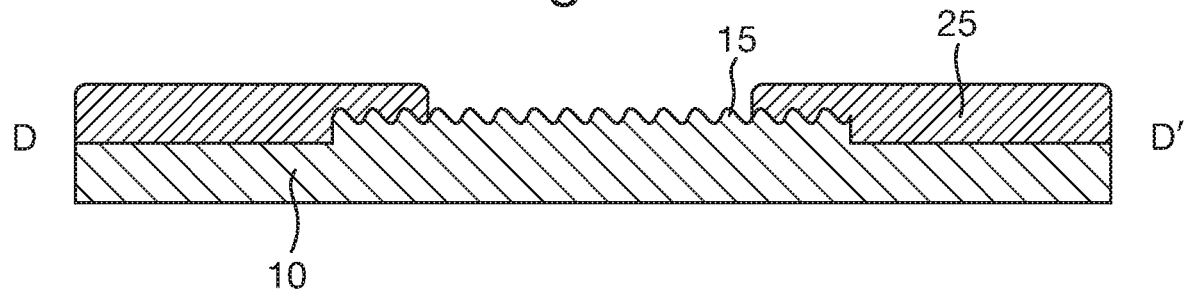

The manufacturing process for this embodiment follows the same initial stages as in the third embodiment, as reflected in FIGS. 8A to 8D. FIG. 8A shows the provision of a substrate with a relief structure in a part of the first surface 10a. FIG. 8B shows the application of a water soluble masking layer to all but a central portion of the relief structure. FIG. 8C shows the application of a reflection enhancing layer over the resist and exposed relief structure 15. FIG. 8D shows the structure after the resist is removed, with reflection enhancing layer remaining only where it was received directly on the relief structure.

The manufacturing process in this embodiment differs in how the absorber layer is applied. In this embodiment, as shown in FIG. 8E, a second masking layer 35 is applied prior to application of the absorber layer. Here, the second masking layer is applied to an outer region of the substantially flat surface portion of the substrate 10, this outer region corresponding to the transparent outer region 1d in the final security device.

FIG. 8F shows the structure of FIG. 8E after application of the absorber layer 30. The absorber layer is received on the reflection enhancing layer coating the relief structure, in what will be the central region 1a of the security device, on the uncoated relief structure, in what will be the first intermediate region 1b of the security device, on the uncoated portion of the substantially flat surface of the substrate 10, in what will be the second intermediate region 1c of the security device, and finally on the second masking layer 35 coating the remainder of the flat surface of the substrate 10, in what will be the transparent outer region 1d of the security device.

Figure 8G:
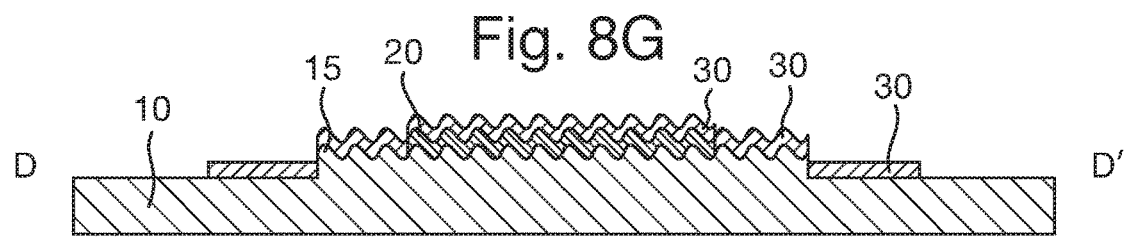

FIG. 8G shows the structure of FIG. 8F after the second masking layer has been removed by washing in the appropriate solvent. The result is that the absorber layer 30 is removed where it was received on the masking layer, leaving the absorber layer 30 on the reflection enhancing layer 20 coating the relief structure 15, in what will be the central region 1a of the security device, on the uncoated relief structure, in what will be the first intermediate region 1b of the security device, and on the uncoated portion of the substantially flat surface of the substrate 10, in what will be the second intermediate region 1c of the security device.

Figure 8H:
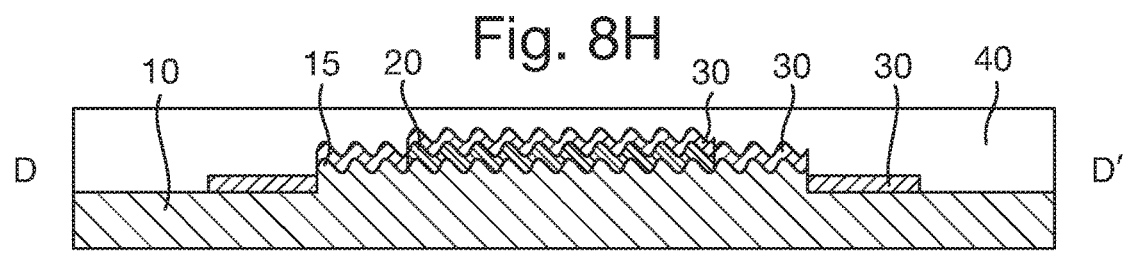

FIG. 8H shows the structure of FIG. 8G after application of the optical spacer layer. The optical spacer layer is applied over the entire device, so that it will be present in all of the four regions 1a, 1b, 1c, 1d of the final security device. In this embodiment, the optical spacer layer is substantially transparent.

Figure 8I:
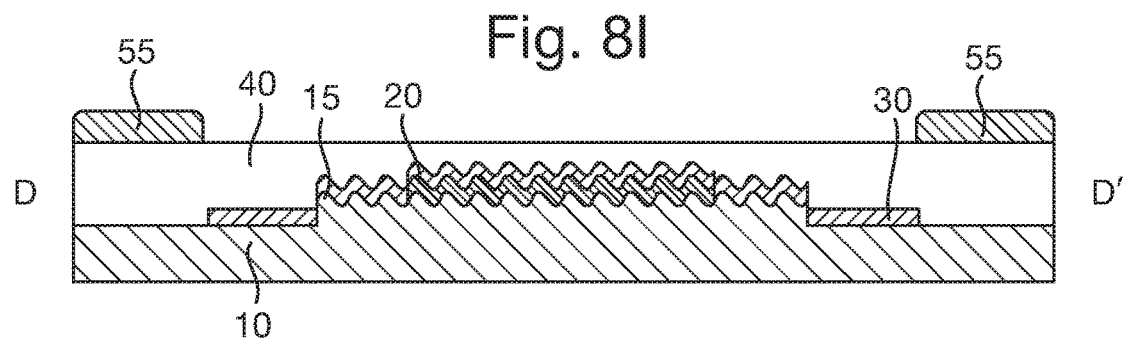

FIG. 8I shows the structure of FIG. 8H after application of a third masking layer 55. The third masking layer is applied onto the optical spacer layer so as to match the region in which the second masking layer 35 was applied. In other words, the third masking layer is applied on the optical spacer layer in an outer region corresponding to the transparent outer region 1d in the final security device.

Figure 8J:
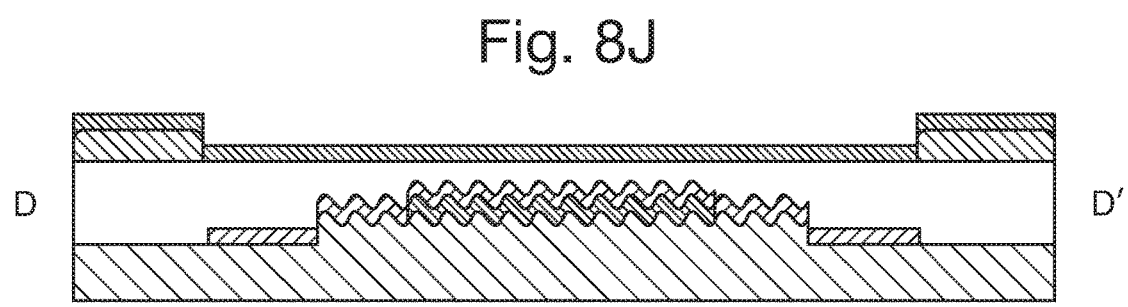

FIG. 8J shows the structure of FIG. 8H after application of the reflector layer 50. The reflector layer 50 coats the optical spacer layer 40 where it did not receive the masking layer 55 and coats the masking layer 55 where it was received on the optical spacer layer 40.

Figure 8K:
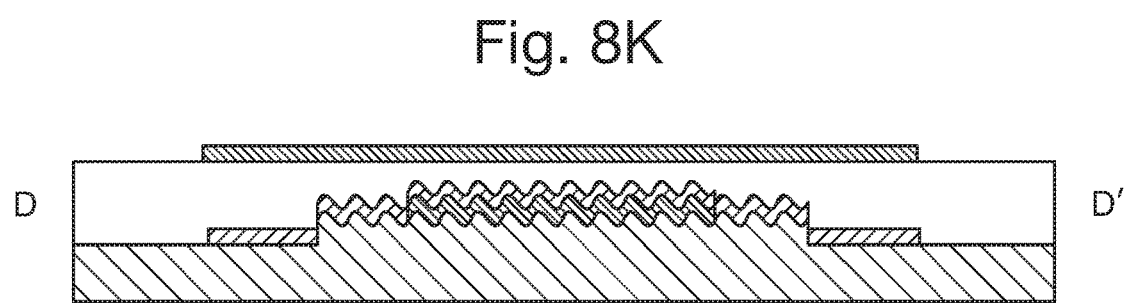

FIG. 8K shows the structure of FIG. 8J after removal of the third masking layer 55 by washing in the appropriate solvent. The result is the provision of the reflector layer on the optical spacer layer only in the regions that also have the absorber layer, i.e. in what will be the central region 1a of the security device, the first intermediate region 1b of the security device, and the second intermediate region 1c of the security device.

As described above, when this device is viewed in reflection, the central region 1a will exhibit a decoupled diffractive effect as the reflection enhancing layer 20 and the absorber layer 30, together, reflect substantially all light incident in the central region, preventing the colour-shifting structure from producing the thin-film interference that generates the colour-shift effect. The first intermediate region when viewed in reflection, will exhibit coupled diffractive and colour-shift effects as the absorber layer acts to reflect only a portion of the incident light, allowing some of the incident light to pass through to the body of the colour-shifting structure. The second intermediate region 1c, when viewed in reflection, will exhibit a decoupled colour-shift effect as a colour-shifting structure exists (formed of the absorber layer, optical spacer layer and reflector layer) without any relief structure being present. Finally, the outer region 1d will appear as transparent, as only the transparent substrate 10 and the transparent optical spacer layer 40 are provided in this region. While the design selected here provides a transparent region as an outer region to improve the appearance of the device when incorporated into an article, the transparent region is not limited to being provided at the edges of the security device. Indeed, in some embodiments, transparent regions may alternatively or in addition be provided so as to define clear text in the body of the security device. Such transparent regions would be formed using the same principle of providing masking layers that result in no reflection enhancing layer, absorber layer or reflector layer in the desired region.

A fifth embodiment of the invention will now be described with reference to FIGS. 9A to 9D.

The security device according to the fifth embodiment has an appearance substantially the same as shown in FIG. 7. The manufacture of the security device according to the fifth embodiment comprises the same first eight stages described above with reference to FIGS. 8A to 8H. The stage of manufacture shown in FIG. 9A corresponds to the stage shown in FIG. 8H, i.e. after application of the optical spacer layer 40.

FIG. 9B shows the structure of FIG. 9A after application of a reflector layer 50. Here the reflector layer is applied, as has been described above, such that it coats the entire exposed upper surface of the optical spacer layer 40, i.e. being provided in each of the regions 1a, 1b, 1c, 1d.

FIG. 9C shows the structure of FIG. 9B after application of a resist layer 55'. The resist layer 55' is applied over the reflector layer 50 in the regions in which the reflector layer should be retained in the final security device. In this case, the resist layer 55' is applied in regions corresponding to the central region 1a, the first intermediate region 1b, and the second intermediate region 1c. The resist layer is not provided in the region corresponding to the outer region 1d of the security device. Suitable examples of resist layers include vinyl resins such as UCAR™ VMCA Solution Vinyl Resin or UCAR™ VCMH Solution Vinyl Resin, both of which are supplied by The Dow Chemical Company and which are carboxy-functional terpolymers comprised of vinyl chloride, vinyl acetate and maleic acid.

FIG. 9D shows the structure of FIG. 9C after having undergone an etching process to remove any exposed reflector layer 50. Here, the etching process removes the reflector layer 50 where it was not covered by the resist 55', i.e. in the region corresponding to the outer region 1d of the security device. Etching may be performed, as is understood in the art, by immersing the structure in an etchant solution which dissolves or otherwise removes the uncovered metal. For example, where the reflection enhancing layer is aluminium, sodium hydroxide can be used as the etchant. Where the reflective layer is copper, an acidic etchant is typically used, such as (i) a mixture of Hydrochloric acid 50% v and Ferric chloride (40 Baume) 50% v, at room temperature; or (ii) a mixture of Sulphuric acid (66 Baume) 5-10% v and Ferrous sulphate 100 g/litre, at 40 to 60 degrees C. Other etchants may also be used, such as nitric acid.

As with the fourth embodiment, when the device according to the fifth embodiment is viewed in reflection, the central region 1a will exhibit a decoupled diffractive effect as the reflection enhancing layer 20 and the absorber layer 30, together, reflect substantially all light incident in the central region, preventing the colour-shifting structure from producing the thin-film interference that generates the colour-shift effect. The first intermediate region when viewed in reflection, will exhibit coupled diffractive and colour-shift effects as the absorber layer acts to reflect only a portion of the incident light, allowing some of the incident light to pass through to the body of the colour-shifting structure. The second intermediate region 1c, when viewed in reflection, will exhibit a decoupled colour-shift effect as a colour-shifting structure exists (formed of the absorber layer, optical spacer layer and reflector layer) without any relief structure being present. Finally, the outer region 1d will appear as transparent, as only the transparent substrate 10 and the transparent optical spacer layer 40 are provided in this region.

A sixth embodiment of the invention will now be described with reference to FIGS. 10 to 11G.

Figure 10:
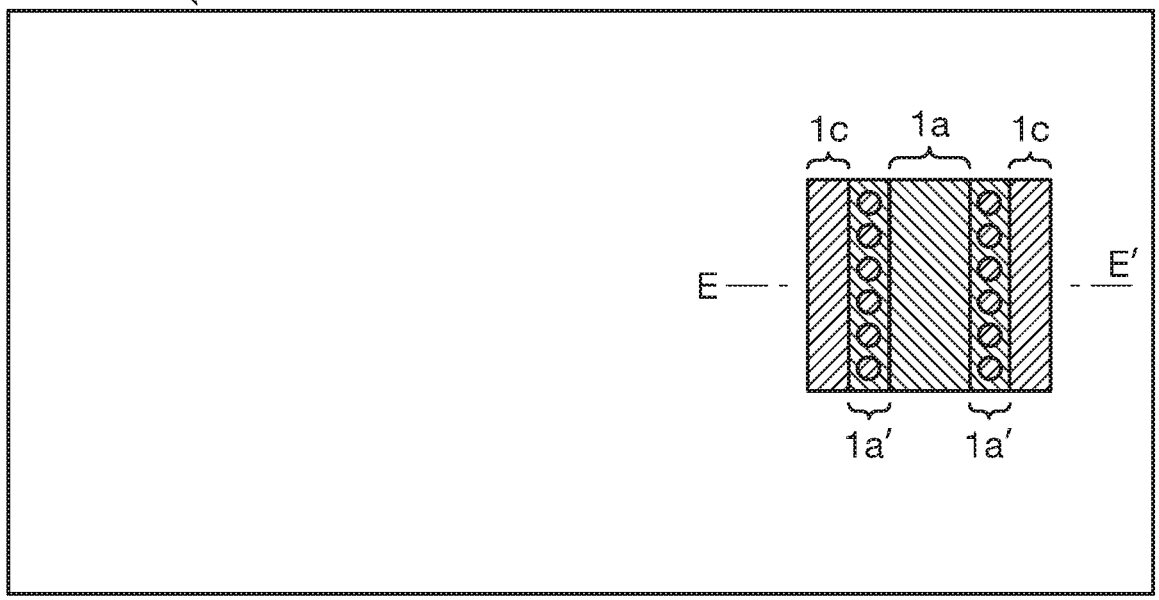
FIG. 10 shows, schematically, a front view of a security document having a security device according to a sixth embodiment.

FIG. 10 shows a security article, in this case a security document 100, having a security device 1 on one surface. The security device 1 has a decoupled diffractive effect in a central region 1a and a decoupled colour-shift effect in two outer regions 1c. Two halftone regions 1a' are provided between the central region 1a and the two outer regions 1c. The halftone regions 1a' contain discrete elements that vary in size, but could also vary in spacing. In this case, the elements begin, close to the central region 1a having small size, and grow larger closer to the outer region to provide the halftone effect. Each element exhibits a coupled diffractive and colour-shift effect, while the areas around the elements exhibit the decoupled diffractive effect. The halftone pattern of the elements provides that, across the halftone region, the exhibited optical effect appears to gradually change from a decoupled diffractive effect to a coupled diffractive and colour-shift effect. These regions are achieved using the multilayer system shown in cross-section along line E-E' at various stages during manufacture in FIGS. 11A to 11G.

Figure 11A:
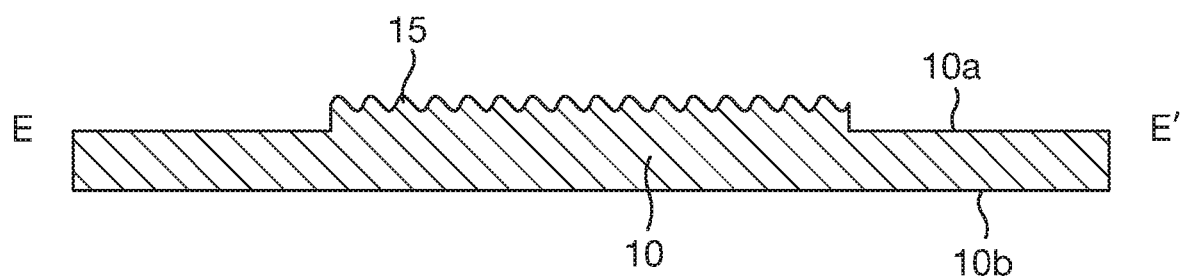
FIGS. 11A to 11G show, schematically, respective cross-sectional views of a security device according to the sixth embodiment of the invention at seven different stages during manufacture.

FIG. 11A shows a substrate 10, as provided in the second to fifth embodiments. The first surface 10a has formed therein a diffractive relief structure 15 that covers what will form the central and halftone regions 1a, 1a' of the final security device. The remaining outer region 1c is provided as a substantially flat surface of the substrate 10.

Figure 11B:
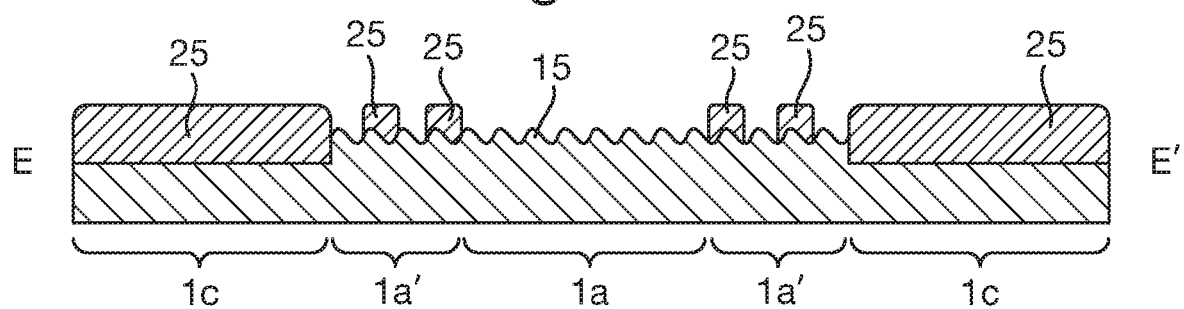

FIG. 11B shows the substrate 10 after application of the masking layer 25. Here, the masking layer is applied such that the central region 1a, i.e. the relief structure, does not have the masking layer 25 and such that the outer region 1c, i.e. the substantially flat region, does have the masking layer. The halftone region 1a' is provided with the masking layer 25 to define the elements of the halftone pattern in the final device, i.e. where the masking layer 25 is provided, the halftone pattern elements will be produced.

Figure 11C:
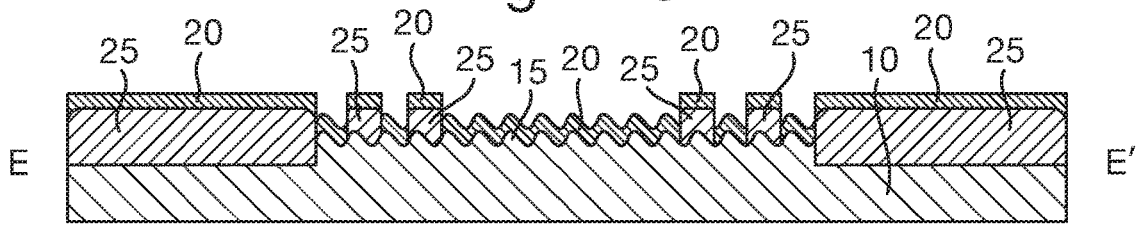

FIG. 11C shows the structure of FIG. 11B after application of the reflection enhancing layer 20. In this case, the reflection enhancing layer is applied over the relief structure 15 and the masking layer 25 such that the reflection enhancing layer 20 is received directly on the relief structure 15 in the central region 1a, and such that it is received on the masking layer 25 in the outer region 1c. Additionally, the reflection enhancing layer will be received in the halftone regions 1a'. Specifically, the reflection enhancing layer 20 will be received on the relief structure 15 where the masking layer 25 is not provided, and will be received on the masking layer 25 where it is provided to define the elements of the halftone patter.

Figure 11D:
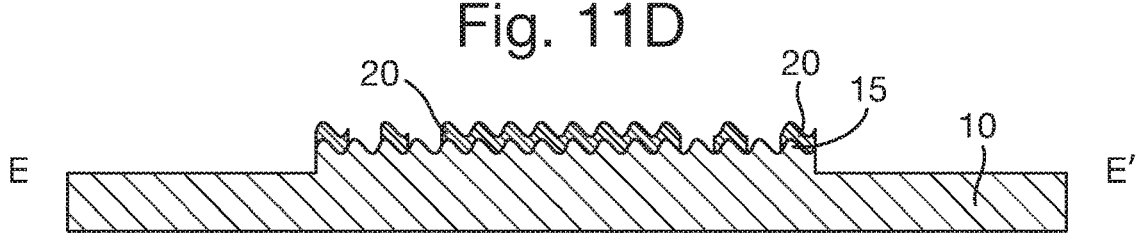

FIG. 11D shows the structure of FIG. 11C after removal of the masking layer 25 by washing in the appropriate solvent. The result is the substrate 10 having a reflection enhancing layer provided on the relief structure in the central region 1a. In the outer region 1c, the substantially flat surface of the substrate 10 remains uncoated. Finally, in the halftone region 1a', a halftone pattern of coated and uncoated relief structure is provided, with elements having no reflection enhancing layer 20 growing in size across the halftone region from the central region 1a to the outer region 1c.

Figure 11E:
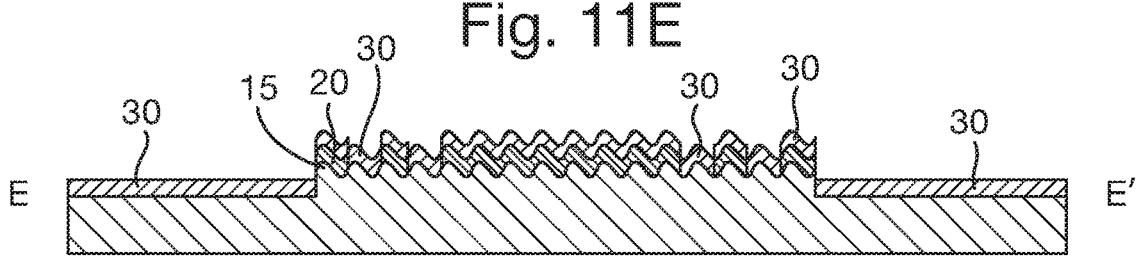

FIG. 11E shows the structure of FIG. 11D after application of the absorber layer 30. The absorber layer 30 is again formed of the same material as the reflection enhancing layer. The absorber layer may be applied by standard deposition processes known in the art, such as vacuum deposition or chemical deposition. The absorber layer 30 is received on the reflection enhancing layer 20 in the central region 1a, again conforming to the relief structure in this embodiment, and also received directly on the substantially flat surface of the substrate 10 in the outer region 1c. Additionally, the absorber layer is received across the entire of the halftone regions 1a', conformally coating the relief structure and the reflection enhancing layer where they are present in accordance with the halftone pattern.

Figure 11F:
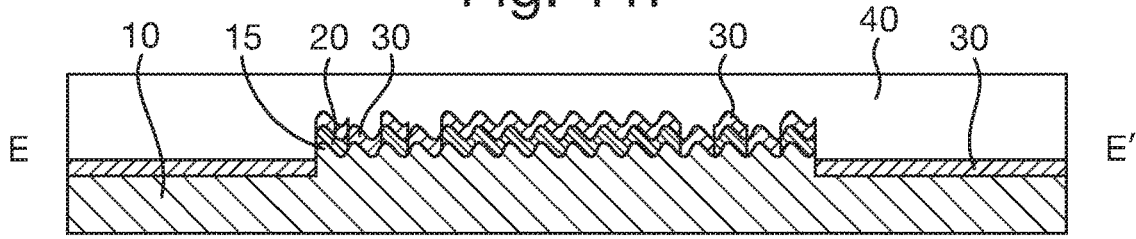

FIG. 11F shows the structure of FIG. 11E after application of the optical spacer layer 40. The optical spacer layer is applied entirely over the absorber layer, which at this stage during manufacture coats the entire uppermost surface of the incomplete security device.

Figure 11G:
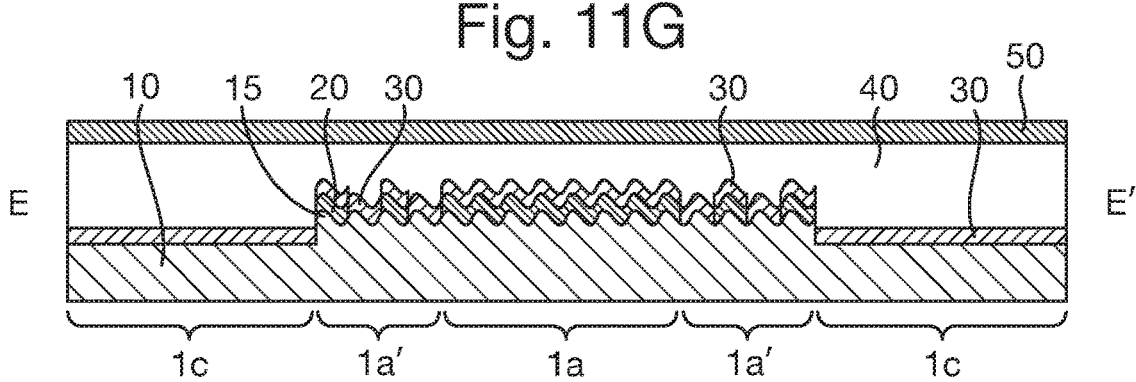

FIG. 11G shows the structure of FIG. 11F after application of the reflector layer 50, i.e. the completed security device. In this embodiment, the reflector layer is applied over the entire upper surface of the optical spacer layer 40.

While this embodiment has halftone regions that provide gradual change from decoupled diffractive effect to a coupled diffractive and colour-shift effect, the halftone regions could alternatively provide gradual changes between any of the regions discussed above by providing the corresponding required layers for the two effects desired in accordance with a halftone pattern. For example, halftone regions could provide a gradual change from a decoupled colour-shift region to a transparent region, which may improve integration of the device into a security document. When halftone regions are to provide a change from colour-shift to transparent, the same halftone patterning may be used in the absorber layer and the overlaying reflector layer.

Examples of security documents incorporating security devices according to the above embodiments will now be described with respect to FIGS. 12A to 13B.

Figure 12A:
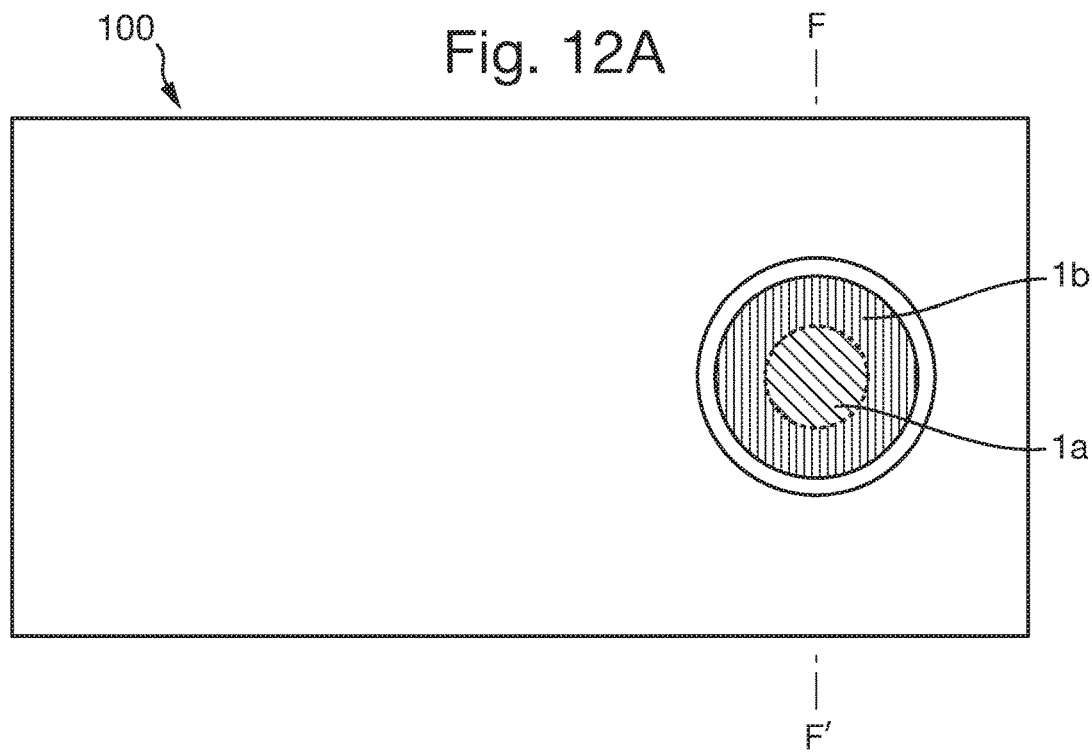
FIG. 12A to 12C show, schematically, a first security document having a security device according to an embodiment in front and first and second alternative cross-section views respectively.
Figure 12B:
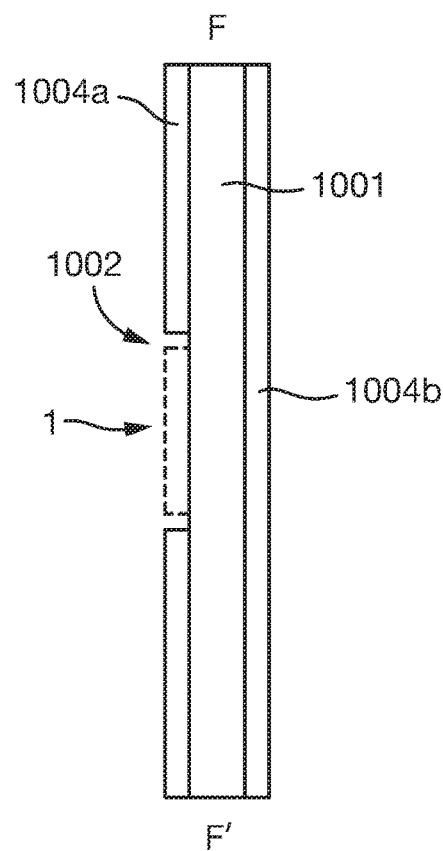
Figure 12C:
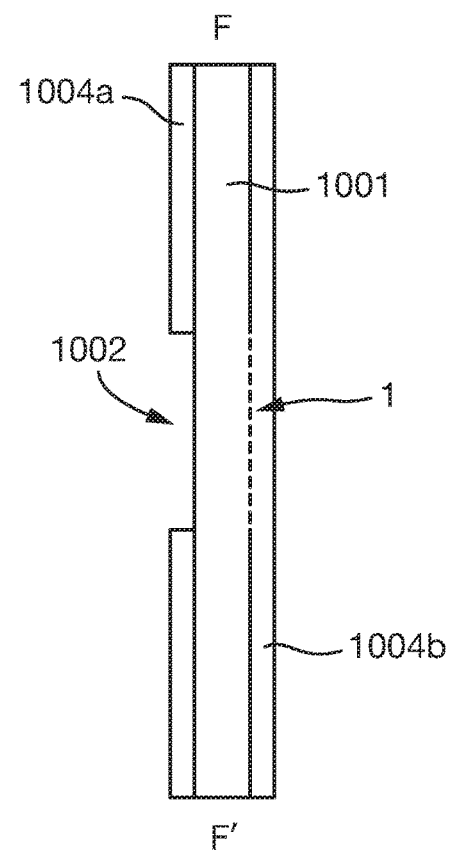

FIGS. 12A to 12C show an exemplary security document 100, here a banknote, in plan view and alternative cross-sections along line F-F'. Here, the banknote 100 is a polymer banknote, comprising an internal transparent polymer substrate 1001 which is coated on each side with opacifying layers 1004a and 1004b in a conventional manner. In some cases, the opacifying layers may be provided on one side of the substrate 1001 only. The opacifying layer 104a is omitted in a region of the document on one side so as to define a half-window 1002, here having a circular shape. Within the window region 1002 is located a security device 1 in accordance with any of the embodiments discussed above. The security device 1 may have been formed separately as a security article such as a transfer stripe, a patch, or a label. In this case, the security device 1 may be affixed to the transparent substrate 1001 inside the window region 1002 by means of a transparent adhesive, as shown in the first alternative of FIG. 12B. Application may be achieved by a hot or cold transfer method e.g. hot stamping. Alternatively, the security device 1 may be formed integrally in the banknote 100, as shown in the alternative of FIG. 12C, with the relief structure being formed directly in the surface of transparent substrate 1001, which acts as the substrate 10 described above with reference to FIGS. 1 to 11G. In this case, as the device is configured for viewing through the substrate 10, the device will typically be provided in a surface of the document substrate 101 on the opposite side to the gap in the opacifying layer 104a forming the half-window and overcoated with opacifying layer on the surface on which it is provided.

It should be noted that a similar construction could be achieved using a paper/plastic composite banknote in which the opacifying layers 1004a and 1004b are replaced by paper layers laminated (with or without adhesive) to an internal transparent polymer layer 1001. The paper layers may be omitted from the window region from the outset, or the paper could be removed locally after lamination. In other constructions, the order of the layers may be reversed with a (windowed) paper layer on the inside and transparent polymer layers on the outside.

Figure 13A:
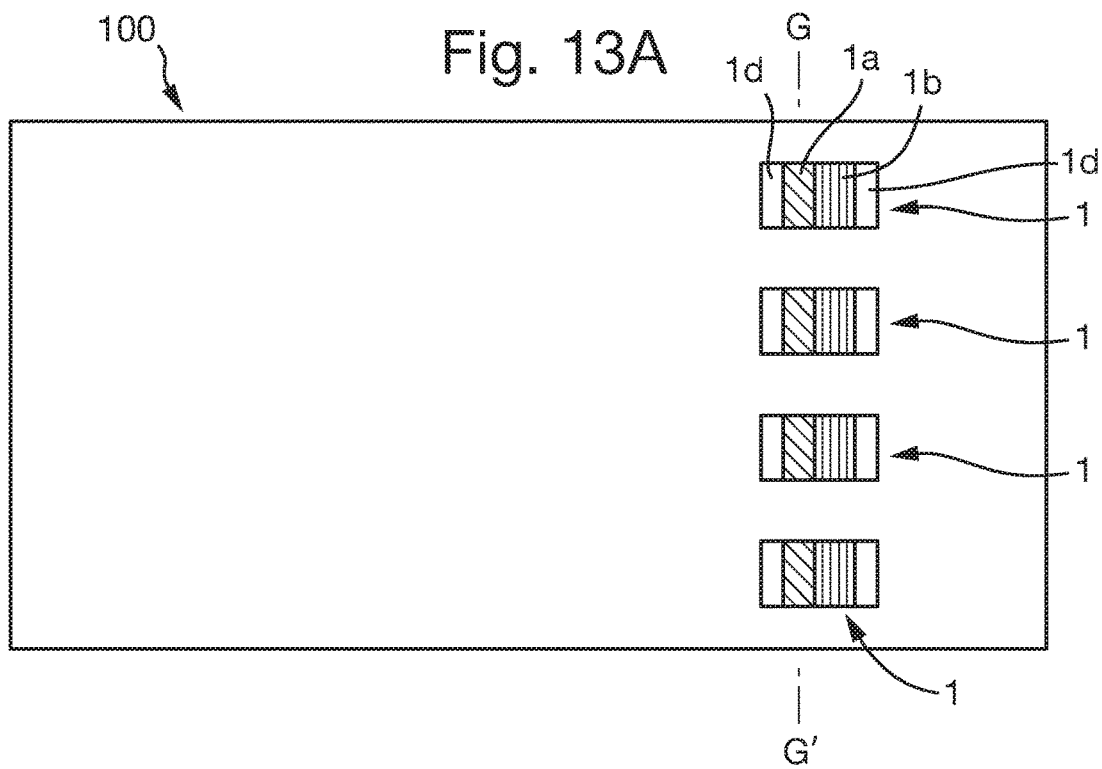
FIGS. 13A and 13B show, schematically, a second security document having a security device according to an embodiment in front and cross-section views respectively.
Figure 13B:
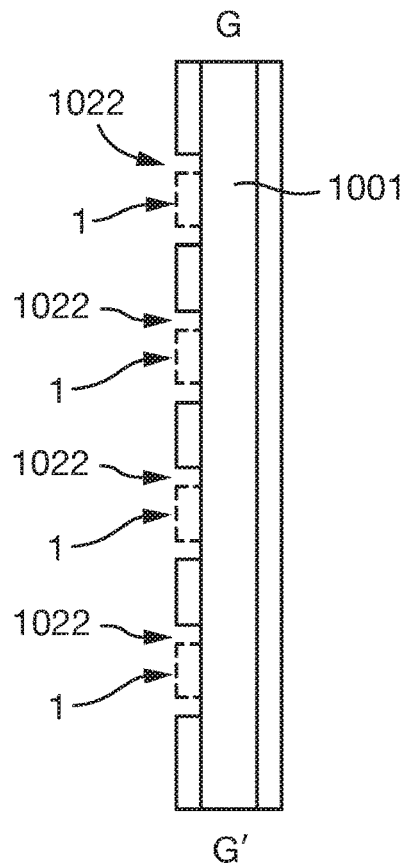

FIGS. 13A and 13B show another exemplary security document, here a banknote 100, in plan view and cross-section along line G-G' respectively, to which a security article in the form of a security thread or security strip has been applied. Four security devices 1 are revealed through windows 1022, arranged in a line on the document. FIG. 21B shows the security thread or strip as four separate security devices individually applied to the surface of the transparent substrate 1001 in respective windows 1022; however they could alternatively be integrally formed in the substrate 1001 or applied as a single device having four regions revealed through an overcoated opacifying layer.

In the above examples described with respect to FIGS. 12A to 13B, the security device is provided in half-windows of a security document. However, it will be appreciated that, as the device is to be viewed primarily in reflected light, it could alternatively be applied to an opaque substrate such as a paper substrate or an opacifying on a polymer banknote. In this case it would be applied in a conventional manner as a transfer stripe, patch or label with application achieved as described above.

The above described security devices could alternatively be applied to or formed directly on other types of security document including identification cards, driving licenses, bankcards and other value documents.

Various embodiments according to the fourth to sixth aspects of the invention will now be described. First, a seventh embodiment of the invention will be described with reference to FIGS. 14 to 15E.

FIG. 14 shows a security article, in this case a security document 100, having a security device 101 on one surface. The security device 101 has two distinct regions 101a, 101b. In a central region 101a (the first region mentioned above with reference to the fourth aspect), the security device exhibits a decoupled diffractive effect. In an outer region 101b (the second region mentioned above with reference to the fourth aspect), the security device exhibits coupled diffractive and colour-shift effects. These distinct regions are achieved using the multilayer system shown in cross-section along line H-H' at various stages during manufacture in FIGS. 15A to 15E.

FIG. 15A shows a substrate 10, which in this embodiment, forms the supporting layer of the security device. The substrate 10 is made of a substantially transparent material to allow the finished security device to be viewed through the substrate 10. While the substrate is transparent in this embodiment, and the embodiments discussed below, alternatively a substrate carrying a coloured tint could be used. The substrate 10 has opposing first and second surfaces 10a, 10b. The first surface 10a has formed therein a diffractive relief structure 15. In this embodiment, the diffractive relief structure 15 covers the entire first surface of the substrate 10.

FIG. 15B shows the substrate 10 after application of a reflection enhancing layer 20 (first reflection enhancing layer). In this embodiment, the reflection enhancing layer 20 acts both as the reflection enhancing layer of the diffractive relief structure 15 and as the absorber layer of a colour-shifting structure. The reflection enhancing layer is therefore selected of a material and thickness so as to be only partially reflective. The materials and thicknesses mentioned above with reference to the first embodiment are suitable for this embodiment. The reflection enhancing layer 20 may be applied by standard deposition processes known in the art, such as vacuum deposition, or by chemical vapour deposition. In this embodiment, the reflection enhancing layer forms a conformal coating on the relief structure 15 across the entire surface of the substrate 10.

Figure 15C:
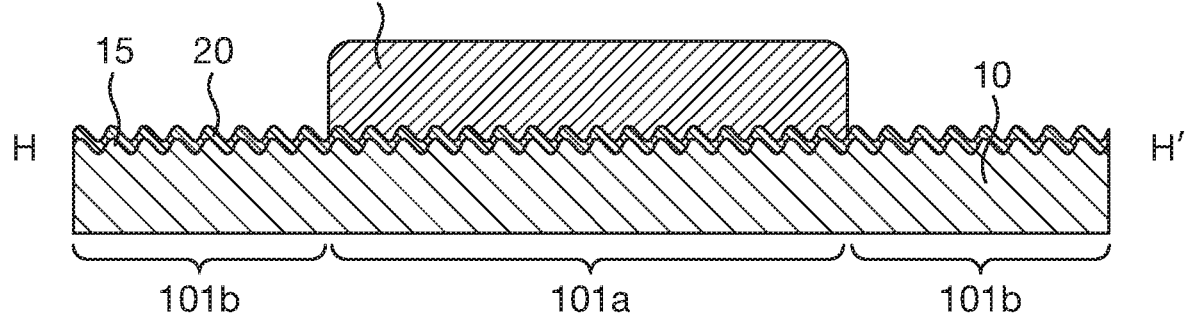

FIG. 15C shows the structure of FIG. 15B after application of an interrupting layer 125. The interrupting layer 125 is applied on the reflection enhancing layer 20 in a region corresponding to the central region 101a of the final security device. The interrupting layer 125 is preferably a printed ink layer, and in this case is a transparent printed ink. Suitable inks should have good adhesion to metal and good alkali and acid resistance and thus contain resin components such as carboxyl modified vinyl resins. UCAR™ VMCA Solution Vinyl Resin or UCAR™ VCMH Solution Vinyl Resin, both of which are supplied by The Dow Chemical Company, are examples of suitable inks. The ink itself could be comprised of UV curable material such as acrylic based resins, cured using either a cationic or free-radical system as is known in the art. The interrupting layer 125 is provided having a thickness that is large enough to suppress the thin-film interference effects that produce the colour-shifting appearance in a colour-shifting structure. Suitable thicknesses include those in the range 0.5 to 5 µm, or preferably 1 to 2 µm.

Figure 15D:
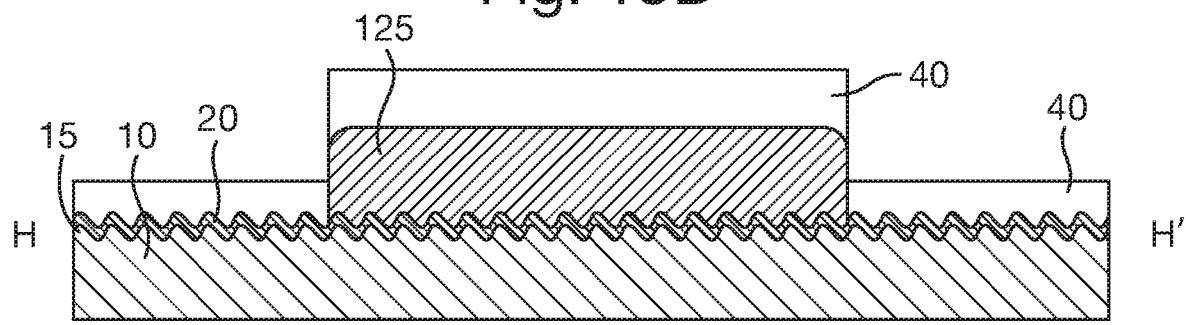

FIG. 15D shows the structure of FIG. 15C after application of the optical spacer layer 40. The optical spacer layer 40 is applied over the entire surface of the security device 101, coating the reflection enhancing layer 20 and the interrupting layer 125 across the surface of the substrate 10. The optical spacer layer may be selected from suitable dielectric materials well known in the art, and is preferably an organic spacer layer applied in liquid form. Example systems would include unsaturated resins or monomers, pre-polymers, oligomers etc. containing vinyl or acrylate unsaturation for example and which cross-link through use of a photo initiator activated by the radiation source employed e.g. UV. The thickness of the optical spacer layer will typically be in the range 100 to 400 nm.

Figure 15E:
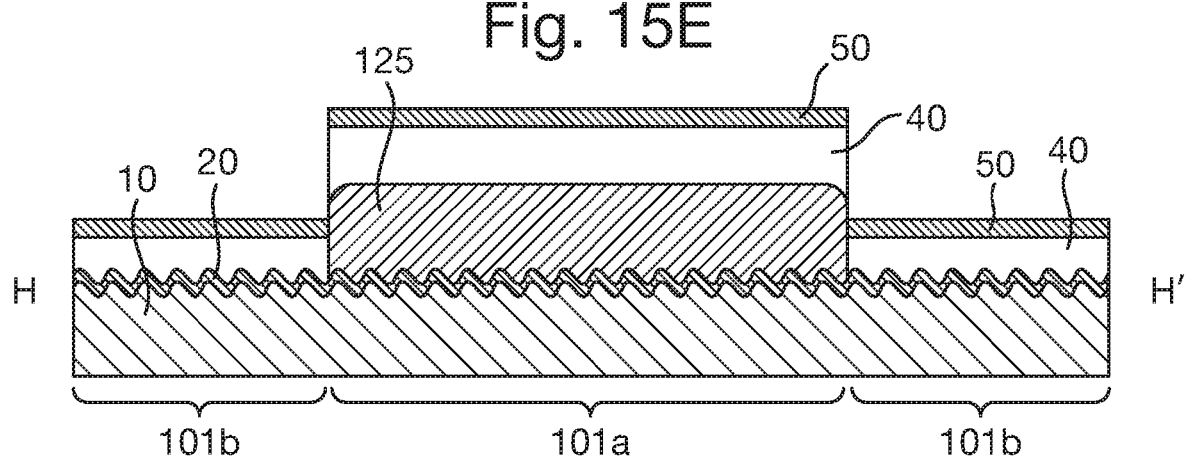

FIG. 15E shows the structure of FIG. 15D after application of a reflector layer 50, i.e. the completed security device. In this embodiment, the reflector layer is applied over the entire upper surface of the optical spacer layer. The reflector layer may be selected from reflective materials known in the art and suitable for use in a colour-shifting structure as a reflector layer. Such materials are typically substantially entirely reflective, but may also be only partially reflective. In this embodiment, a fully reflective, 40 nm thick aluminium coating is used as the reflector layer. The reflector layer may be applied by standard deposition processes known in the art, such as vacuum deposition or chemical deposition.

The resulting security device 101 is typically viewed in reflection. The security device will be oriented such that the reflection enhancing layer 20, interrupting layer 125, optical spacer layer 40 and reflector layer 50 are viewed through the substrate 10. As described above, when this device is viewed in reflection, the central region 101a will exhibit a decoupled diffractive effect since the interrupting layer 125 provides additional spacing between the reflection enhancing layer 20, which acts as an absorber layer, and the reflector layer 50, such that the thin-film interference effects are suppressed. The outer region 101b, on the other hand, does not have the interrupting layer, and so, in addition to the reflection enhancing layer providing the diffractive effect produced by the relief structure 15, the reflection enhancing layer 20, optical spacer layer 40, and reflector layer 50 act as a colour-shifting structure and contribute to the appearance of the device in this region.

An eighth embodiment of the invention will now be described with reference to FIGS. 16 to 17E.

FIG. 16 shows a security article, in this case a security document 100, having a security device 101 on one surface. The security device 101 has two distinct regions 101a, 101c. In the central region 101a, the security device exhibits a decoupled diffractive effect. In the outer region 1c, the security device exhibits a decoupled colour-shift effect. These distinct regions are achieved using the multilayer system shown in cross-section along line I-I' at various stages during manufacture in FIGS. 17A to 17E.

FIG. 17A shows a substrate 10, which forms the supporting layer of the security device 101. The substrate 10 is made of a substantially transparent material to allow the finished security device to be viewed through the substrate 10. The substrate 10 has opposing first and second surfaces 10a, 10b. The first surface 10a has formed therein a diffractive relief structure 15. In this embodiment, the diffractive relief structure 15 covers the only a part of the first surface of the substrate 10, specifically, the central region 101a of the security device. The remaining outer region 101c is provided as a substantially flat surface of the substrate 10.

FIG. 17B shows the shows the substrate 10 after application of a reflection enhancing layer 20. In this embodiment, the reflection enhancing layer 20 again acts both as the reflection enhancing layer of the diffractive relief structure 15 and as the absorber layer of a colour-shifting structure. The reflection enhancing layer is therefore selected of a material and thickness so as to be only partially reflective. In this embodiment, the reflection enhancing layer forms a conformal coating on the relief structure 15 across the central region 101a and provides a substantially flat coating on the substantially flat surface of the substrate in the outer region 101c.

Figure 17C:
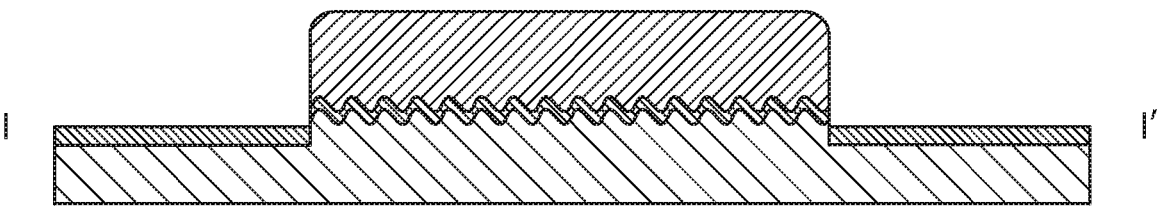

FIG. 17C shows the shows the structure of FIG. 17B after application of an interrupting layer 125. The interrupting layer 125 is applied on the reflection enhancing layer 20 on the relief structure, i.e. in the central region 101a. The interrupting layer is not received over the substantially flat surface of the substrate 10 that will form the outer region 101c. The interrupting layer may be of the materials and thicknesses discussed above with respect to the seventh embodiment.

Figure 17D:
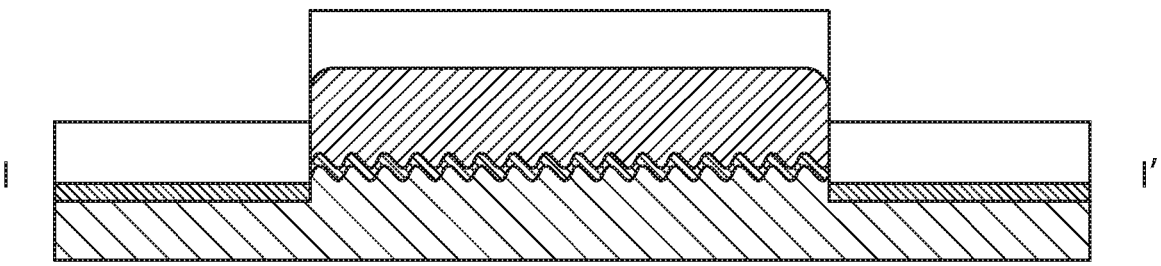

FIG. 17D shows the structure of FIG. 17C after application of the optical spacer layer 40. The optical spacer layer 40 is applied over the entire surface of the security device 101, coating the reflection enhancing layer 20 and the interrupting layer 125 across the surface of the substrate 10.

Figure 17E:
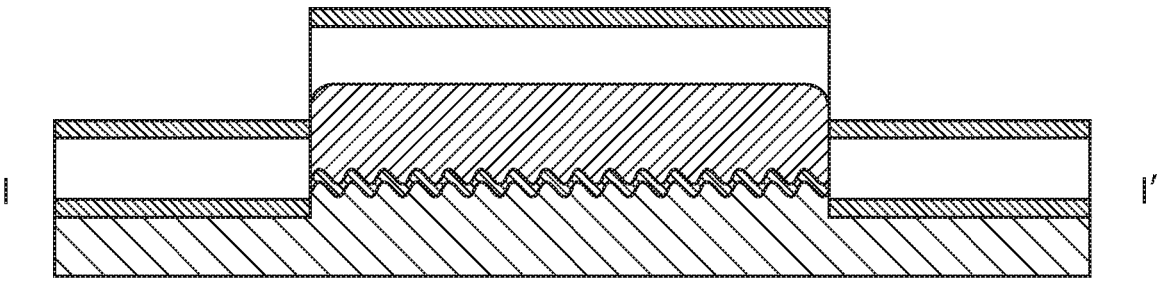

FIG. 17E shows the structure of FIG. 17D after application of a reflector layer 50. In this embodiment, the reflector layer is again applied over the entire upper surface of the optical spacer layer.

As described above, when this device is viewed in reflection, the central region 101a will exhibit a decoupled diffractive effect since the interrupting layer 125 provides additional spacing between the reflection enhancing layer 20, which acts as an absorber layer, and the reflector layer 50, such that the thin-film interference effects are supressed. The outer region 101*b*, on the other hand, has neither the interrupting layer 125 nor the relief structure 15, and so produces a decoupled colour-shift effect resulting from the reflection enhancing layer 20, optical spacer layer 40 and the reflector layer 50.

A ninth embodiment will now be described with reference to FIGS. 18 to 19I.

FIG. 18 shows a security article, in this case a security document 100, having a security device 101 on one surface. The security device 101 has four distinct regions 101*a*, 101*b*, 101*c*, 101*d*. In a central region 101*a*, the security device exhibits a decoupled diffractive effect. In first intermediate region 101*b*, the security device exhibits coupled colour-shift and diffractive effects. In a second intermediate region 101*c*, the security device exhibits a decoupled colour-shift effect. Finally, in an outer region 101*d* the device is substantially transparent. These distinct regions are achieved using the multilayer system shown in cross-section along line J-J' at various stages during manufacture in FIGS. 19A to 19I.

FIG. 19A shows a substrate 10 substantially as shown in and described above with reference to FIG. 17A. Here, the relief structure is provided in what will be the central and first intermediate regions 101*a*, 101*b* of the security device.

FIG. 19B shows the substrate 10 after application of a first soluble masking layer 135. The first masking layer is applied to what will form the transparent outer region 101*d* of the security device. The masking layer may be selected from any suitable soluble masking layers widely known in the art. Preferably, however, the masking layer is a water soluble masking layer.

Figure 19C:
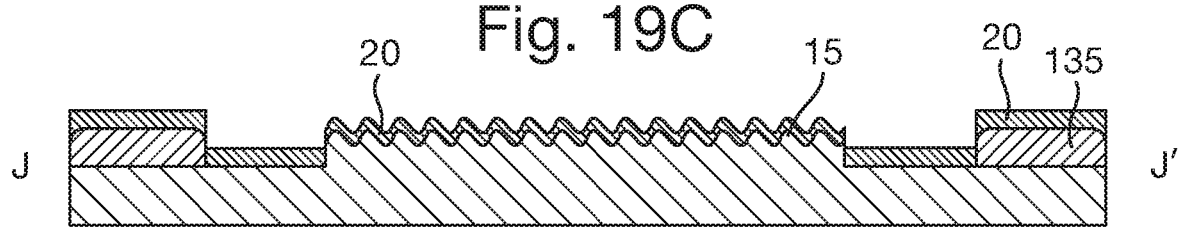

FIG. 19C shows the structure of FIG. 19B after application of a first reflection enhancing layer 20. In this embodiment, the reflection enhancing layer will be acting as both a reflection enhancing layer on the diffractive relief structure and as an absorber layer in a colour-shifting structure. The reflection enhancing layer 20 is received on the first surface of the substrate 10*a* on the entire relief structure 15 and in the second intermediate region 20*c*. The reflection enhancing layer 20 is also received on the masking layer 135, where provided.

Figure 19D:
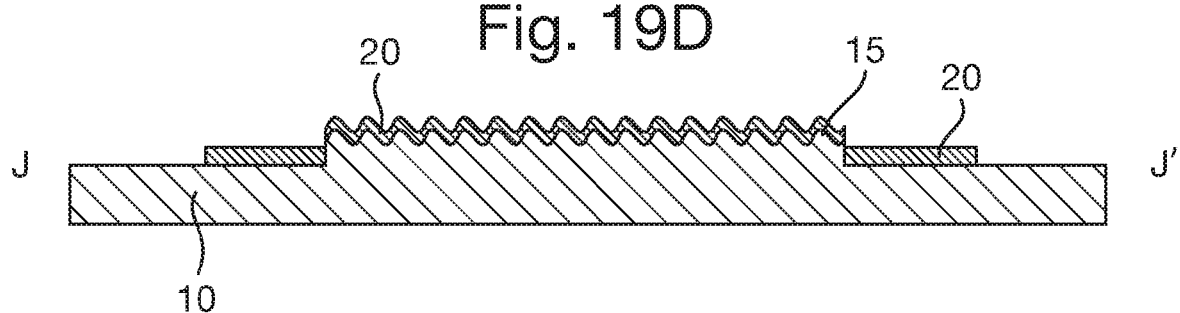

FIG. 19D shows the structure after removal of the masking layer by washing in the appropriate solvent. Here, the reflection enhancing layer has been removed from the outer region 101*d*, but remains in the central and first and second intermediate regions 101*a*, 101*b*, 101*c*.

Figure 19E:
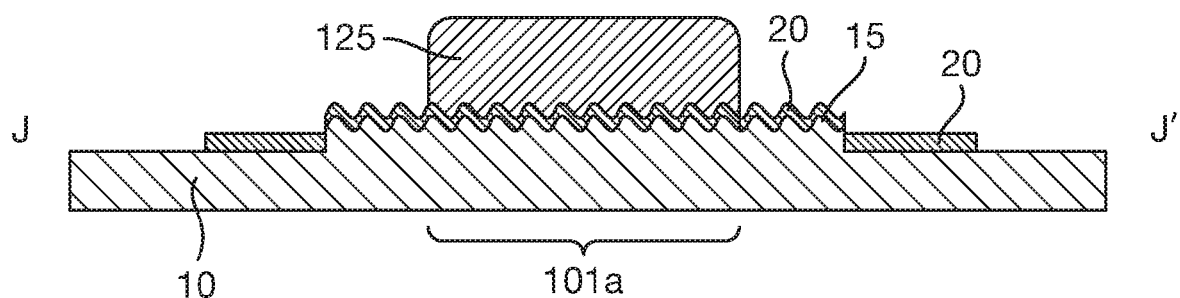

FIG. 19E shows the structure of FIG. 19D after application of the interrupting layer 125. The interrupting layer may, again, be a transparent printed ink of a material and thickness as described above with respect to the embodiment of FIG. 15. The interrupting layer is applied in only a central portion of the relief structure, i.e. in the central region 101*a* of the final security device, leaving a portion of the relief structure uncovered by the interrupting layer.

Figure 19F:
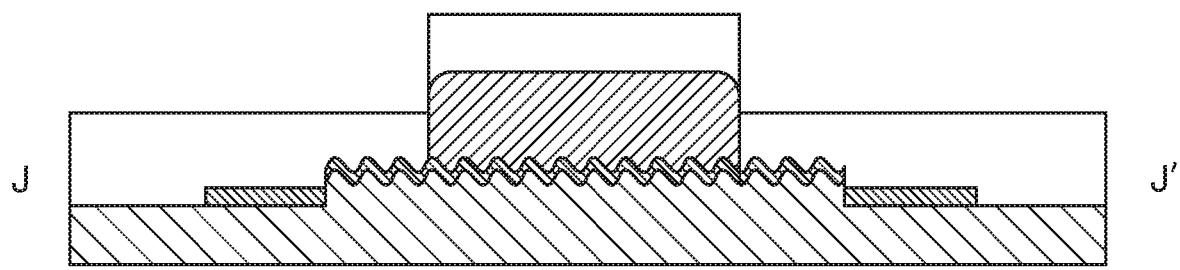

FIG. 19F shows the structure after application of the optical spacer layer 40, which as described above, is applied over the entire surface of the security device, i.e. across all of the four regions of the device of this embodiment.

Figure 19G:
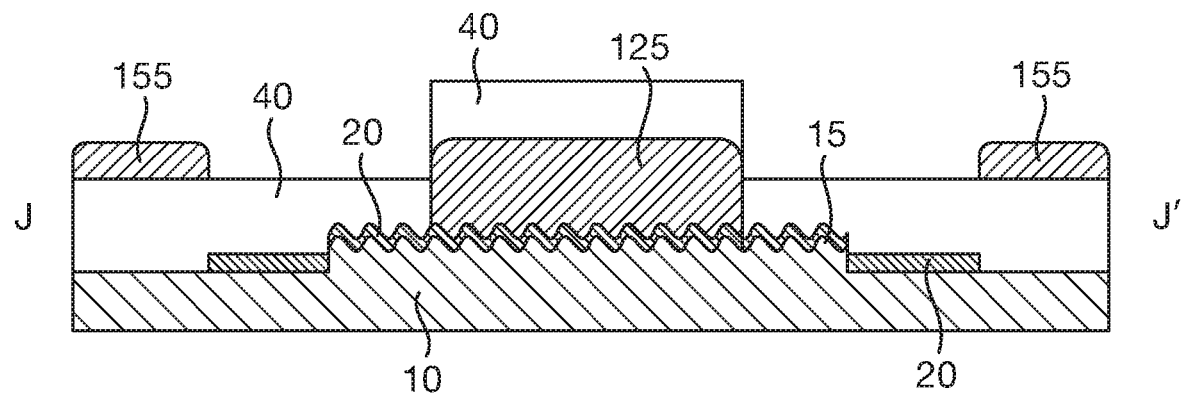

FIG. 19G shows the structure after application of a second masking layer 155 to the exposed surface of the optical spacer layer 40. The second masking layer 155 is the same as the first and is applied to match the region in which the first masking layer 135 was applied. That is, the second masking layer is applied to a region corresponding to the transparent outer region 101*d* of the security device.

Figure 19H:
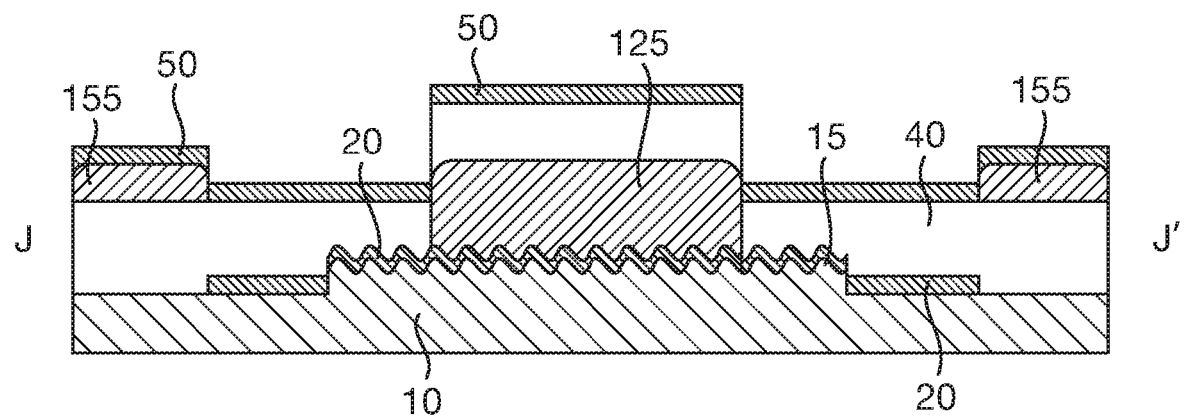

FIG. 19H shows the structure after application of the reflector layer 50. The reflector layer 50 coats the optical spacer layer 40 where it did not receive the masking layer 155 and coats the masking layer 155 where it was received on the optical spacer layer 40.

Figure 19I:
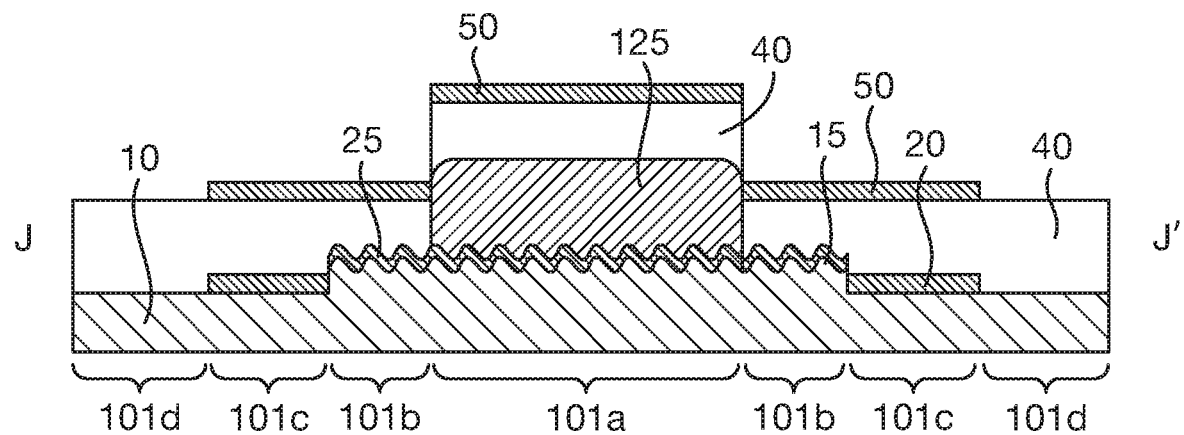

FIG. 19I shows the structure after removal of the second masking layer 155 by washing in the appropriate solvent. The result is the provision of the reflector layer 50 on the optical spacer layer only in the regions that also have the absorber layer, i.e. in what will be the central region 101*a* of the security device, the first intermediate region 101*b* of the security device, and the second intermediate region 101*c* of the security device. The reflector layer 50 is removed from the outer region 101*d* of the security device.

When the device is viewed in reflection, the central region 101*a* exhibits a decoupled diffractive effect produced by the reflection enhancing layer 20 coating the relief structure. The colour-shift effect is suppressed in this region by the interruption layer 125, which spaces the reflection enhancing layer from the optical spacer layer 40 and reflector layer 50. In the first intermediate region 101*b*, a coupled diffractive and colour-shift effect is produced, since the reflection enhancing layer 20 coating the relief structure is provided adjacent the optical spacer layer 40 and reflector layer 50 needed to generate thin-film interference. The second intermediate region 101*c* exhibits a decoupled colour-shift effect, as the reflection enhancing layer 20, optical spacer layer 40 and reflector layer 50 are present with no relief structure. Finally, the outer region 101*d* is substantially transparent, as only the transparent substrate layer 10 and optical spacer layer 40 are provided. While the design selected here provides a transparent region as an outer region to improve the appearance of the device when incorporated into an article, the transparent region is not limited to being provided at the edges of the security device. Indeed, in some embodiments, transparent regions may alternatively or in addition be provided so as to define, for example, clear text in the body of the security device. Such transparent regions would be formed using the same principle of providing masking layers that result in no first or second reflection enhancing layer or reflector layer in the desired region.

The security devices described above with reference to FIGS. 14 to 19I may be incorporated into security devices in the same manner described with reference to FIGS. 12A to 13B.

The invention claimed is:

1. A method of manufacturing a security device comprising:
    providing a substrate having opposing first and second surfaces and a relief structure formed in the first surface of the substrate;
    applying a reflection enhancing layer partially over the first surface of the substrate such that the reflection enhancing layer at least partially overlaps the relief structure and the reflection enhancing layer is not located in a first region of the first surface of the substrate, the relief structure being formed only in a second region of the first surface of the substrate, which is different from the first region,
    applying an absorber layer over the reflection enhancing layer such that the absorber layer at least partially overlaps the reflection enhancing layer and the relief structure where the reflection enhancing layer and the relief structure overlap each other, and such that the absorber layer at least partially overlaps the first region of the first surface of the substrate;

applying an optical spacer layer over the absorber layer such that the optical spacer layer at least partially overlaps the absorber layer, the reflection enhancing layer, and the relief structure where the absorber layer, the reflection enhancing layer, and the relief structure overlap each other, and such that the optical spacer layer at least partially overlaps the absorber layer and the first region where the absorber layer and the first region overlap each other;

applying a reflector layer, which is formed of an at least partially reflective material, over the optical spacer layer such that the reflector layer at least partially overlaps the optical spacer layer, the absorber layer, the reflection enhancing layer, and the relief structure where the optical spacer layer, the absorber layer, the reflection enhancing layer, and the relief structure overlap each other, and such that the reflector layer at least partially overlaps the optical spacer layer, the absorber layer, and the first region where the optical spacer layer, the absorber layer, and the first region overlap each other; and providing a decoupled colour-shift region where the absorber layer, the optical spacer layer, and the reflector layer overlap a part of the first surface of the substrate in the first region, wherein:
the reflection enhancing layer and the absorber layer are formed of the same material,
the absorber layer, the optical spacer layer, and the reflector layer, together, form a colour-shifting structure, and
the reflection enhancing layer and the absorber layer, together, are substantially opaque or transmit less than 40% of incident light.

2. The method according to claim 1, further comprising applying the reflection enhancing layer to the first surface of the substrate such that the reflection enhancing layer only partially overlaps the relief structure.

3. The method according to claim 1, further comprising applying at least a portion of the reflection enhancing layer so as to define a halftone pattern.

4. The method according to claim 1, further comprising applying the absorber layer in contact with the reflection enhancing layer.

5. The method according to claim 2, further comprising applying the absorber layer so as to at least partially overlap the relief structure where the reflection enhancing layer is absent on the relief structure.

6. The method according to claim 1, wherein a thickness of the reflection enhancing layer is greater than a thickness of the absorber layer.

7. The method according to claim 1, wherein the relief structure is a diffractive relief structure.

8. The method according to claim 2, further comprising providing a coupled effect where the absorber layer, the optical spacer layer, and the reflector layer overlap the relief structure in the second region.

9. A security device comprising:
a substrate having opposing first and second surfaces and a relief structure formed in the first surface of the substrate;
a reflection enhancing layer partially over the first surface of the substrate, the reflection enhancing layer at least partially overlapping the relief structure, the reflection enhancing not being located in a first region of the first surface of the substrate, the relief structure being formed only in a second region of the first surface of the substrate, which is different from the first region;
an absorber layer over the reflection enhancing layer, the absorber layer at least partially overlapping the reflection enhancing layer and the relief structure where the reflection enhancing layer and the relief structure overlap each other, and the absorber layer at least partially overlapping the first region of the first surface of the substrate;
an optical spacer layer over the absorber layer, the optical spacer layer at least partially overlapping the absorber layer, the reflection enhancing layer and the relief structure where the absorber layer, the reflection enhancing layer, and the relief structure overlap each other, the optical spacer layer at least partially overlapping the absorber layer and the first region where the absorber layer and the first region overlap each other;
a reflector layer, which is formed of an at least partially reflective material, over the optical spacer layer, the reflector layer at least partially overlapping the optical spacer layer, the absorber layer, the reflection enhancing layer, and the relief structure where the optical spacer layer, the absorber layer, the reflection enhancing layer, and the relief structure overlap each other, and the reflector layer at least partially overlapping the optical spacer layer, the absorber layer, and the first region where the optical spacer layer, the absorber layer, and the first region overlap each other; and
a decoupled colour-shift region where the absorber layer, the optical spacer layer, and the reflector layer overlap a part of the first surface of the substrate in the first region,
wherein:
the reflection enhancing layer and the absorber layer are formed of the same material,
the absorber layer, the optical spacer layer, and the reflector layer, together, form a colour-shifting structure, and
the reflection enhancing layer and the absorber layer, together, are substantially opaque or transmit less than 40% of incident light.

10. The security device according to claim 9, wherein the reflection enhancing layer only partially overlaps the relief structure.

11. The security device according to claim 9, wherein at least a portion of the reflection enhancing layer is provided so as to define a halftone pattern.

12. The security device according to claim 9, wherein the absorber layer is in contact with the reflection enhancing layer.

13. A The security device according to claim 10, wherein the absorber layer at least partially overlaps the relief structure where the reflection enhancing layer is absent on the relief structure.

14. The security device according to claim 9, wherein a thickness of the reflection enhancing layer is greater than a thickness of the absorber layer.

15. The security device according to claim 9, wherein the relief structure is a diffractive relief structure.

16. The security device according to claim 10, further comprising a coupled effect region where the optical spacer layer and the reflector layer overlap the relief structure in the second region.

17. An article having the security device according to claim 9.

18. A method of manufacturing a security device comprising:
providing a substrate having opposing first and second surfaces and a relief structure formed in the first surface of the substrate;
applying a first reflection enhancing layer over the first surface of the substrate such that the first reflection enhancing layer at least partially overlaps the relief structure;
applying an interrupting layer over the first reflection enhancing layer in a first region such that the interrupting layer at least partially overlaps the first reflection enhancing layer and the relief structure where the first reflection enhancing layer and the relief structure overlap each other and such that the interrupting layer does not overlap the first surface of the substrate in a second region;
when the first reflection enhancing layer overlapping the second region, applying an optical spacer layer over the interrupting layer such that the optical spacer layer at least partially overlaps the interrupting layer, a first layer of reflective material, and the relief structure where the interrupting layer, the first layer of reflective material, and the relief structure overlap each other, and such that the optical spacer layer at least partially overlaps the first reflection enhancing layer in the second region;
when the first reflection enhancing layer does not overlap the second region, applying a second reflection enhancing layer over the first surface of the substrate such that the second reflection enhancing layer at least partially overlaps the second region;
applying the optical spacer layer over the interrupting layer and the second reflection enhancing layer such that the optical spacer layer at least partially overlaps the interrupting layer, the first layer of reflective material, and the relief structure where the interrupting layer, the first layer of reflective material, and the relief structure overlap each other, and such that the optical spacer layer at least partially overlaps the second reflection enhancing layer in the second region; and
applying a reflector layer over the optical spacer layer such that the reflector layer at least partially overlaps the optical spacer layer, the interrupting layer, the first layer of reflective material, and the relief structure where the optical spacer layer, the interrupting layer, the first layer of reflective material, and the relief structure overlap each other, and such that the reflector layer at least partially overlaps the optical spacer layer and the first or second layer of reflective material where the optical spacer layer and the first or second layer of reflective material overlap each other in the second region,
wherein:
the first or second reflection enhancing layers, the optical spacer layer and the reflector layer, together, form a colour-shifting structure that exhibits a colour shift in the second region as a viewing angle or an angle of incident light changes, and
the interrupting layer interrupts the colour shift in the first region.

19. A security device comprising:
a substrate having opposing first and second surfaces and a relief structure formed in the first surface of the substrate;
a first reflection enhancing layer over the first surface of the substrate, the first reflection enhancing layer at least partially overlapping the relief structure;
an interrupting layer over the first reflection enhancing layer in a first region, the interrupting layer at least partially overlapping the first reflection enhancing layer and the relief structure where the first reflection enhancing layer and the relief structure overlap each other, and the interrupting layer not overlapping the first surface of the substrate in a second region;
one of either (i) an optical spacer layer being over the interrupting layer, the optical spacer layer at least partially overlapping the interrupting layer, the first layer of reflective material, and the relief structure where the interrupting layer, the first layer of reflective material, and the relief structure overlap each other, and the optical spacer layer at least partially overlapping the first reflection enhancing layer in the second region, or (ii) the first reflection enhancing layer does not overlap the second region, a second reflection enhancing layer is over the first surface of the substrate, the second reflection enhancing layer at least partially overlapping the second region;
the optical spacer layer over the interrupting layer and the second reflection enhancing layer, the optical spacer layer at least partially overlapping the interrupting layer, the first layer of reflective material, and the relief structure where the interrupting layer, the first layer of reflective material, and the relief structure overlap each other, and the optical spacer layer at least partially overlapping the first or second reflection enhancing layer in the second region; and
a reflector layer over the optical spacer layer, the reflector layer at least partially overlapping the optical spacer layer, the interrupting layer, the first layer of reflective material, and the relief structure where the optical spacer layer, the interrupting layer, the first layer of reflective material, and the relief structure overlap each other, and the reflector layer at least partially overlapping the optical spacer layer and the first or second layer of reflective material where the optical spacer layer and the first or second layer of reflective material overlap each other in the second region,
wherein:
the first or second reflection enhancing layers, the optical spacer layer, and the reflector layer, together, form a colour-shifting structure that exhibits a colour shift in the second region as a viewing angle or an angle of incident light changes, and
the interrupting layer interrupts the colour shift in the first region.

* * * * *